(12) United States Patent
Alley et al.

(10) Patent No.: US 9,555,873 B1
(45) Date of Patent: Jan. 31, 2017

(54) AERIAL VEHICLE WITH DEPLOYABLE COMPONENTS

(71) Applicant: Area- I Inc., Kennesaw, GA (US)

(72) Inventors: Nicholas Robert Alley, Kennesaw, GA (US); Joshua Lemming Steele, Kennesaw, GA (US); Jesse Owen Williams, Kennesaw, GA (US); Daniel Kuehme, Kennesaw, GA (US); Jonathan Caleb Phillips, Kennesaw, GA (US)

(73) Assignee: Area-I Inc., Kennesaw, GA (US)

( * ) Notice: Subject to any disclaimer, the term of this patent is extended or adjusted under 35 U.S.C. 154(b) by 0 days.

(21) Appl. No.: 15/092,237

(22) Filed: Apr. 6, 2016

Related U.S. Application Data

(60) Provisional application No. 62/254,098, filed on Nov. 11, 2015.

(51) Int. Cl.
  *B64C 3/56* (2006.01)
  *B64C 3/54* (2006.01)
  *B64C 39/02* (2006.01)

(52) U.S. Cl.
  CPC .................. *B64C 3/546* (2013.01); *B64C 3/54* (2013.01); *B64C 39/024* (2013.01); *B64C 2201/021* (2013.01); *B64C 2201/102* (2013.01)

(58) Field of Classification Search
  USPC .............. 244/49, 218, 201, 46, 3.27; 446/62
  See application file for complete search history.

(56) References Cited

U.S. PATENT DOCUMENTS

| 4,730,793 | A | * | 3/1988 | Thurber, Jr. .......... B64C 39/024 244/3.1 |
| 6,119,976 | A | | 9/2000 | Roger |
| 6,260,797 | B1 | | 7/2001 | Palmer |
| 6,905,093 | B2 | * | 6/2005 | Dryer ...................... F42B 10/14 244/3.28 |
| 6,923,404 | B1 | | 8/2005 | Liu et al. |
| 7,642,492 | B2 | * | 1/2010 | Parine ..................... F42B 10/14 102/348 |
| 7,841,559 | B1 | * | 11/2010 | O'Shea ................. B64C 39/024 244/219 |
| 7,866,610 | B2 | | 1/2011 | Bousfield |
| 8,089,034 | B2 | | 1/2012 | Hammerquist |
| 8,256,715 | B2 | | 9/2012 | Ballard et al. |

(Continued)

FOREIGN PATENT DOCUMENTS

EP 2 604 510 6/2013

*Primary Examiner* — Christopher P Ellis
(74) *Attorney, Agent, or Firm* — Bekiares Eliezer LLP

(57) ABSTRACT

An unmanned aerial vehicle with deployable components (UAVDC) is disclosed. The UAVDC may comprise a fuselage, at least one wing, and at least one control surface. In some embodiments, the UAVDC may further comprise a propulsion means and/or a modular payload. The UAVDC may be configured in a plurality of arrangements. For example, in a compact arrangement, the UAVDC may comprise the at least one wing stowed against the fuselage and the at least one control surface stowed against the fuselage. In a deployed arrangement, the UAVDC may comprise the at least one wing deployed from the fuselage and the least one control surface deployed from the fuselage. In an expanded arrangement, the UAVDC may comprise the at least one wing telescoped to increase a wingspan of the deployed arrangement.

14 Claims, 27 Drawing Sheets

(56) References Cited

U.S. PATENT DOCUMENTS

| | | | |
|---|---|---|---|
| 8,492,692 B2* | 7/2013 | Fisher | B64C 39/024 |
| | | | 244/13 |
| 8,783,604 B2* | 7/2014 | Sanderson | B64C 3/56 |
| | | | 244/123.1 |
| 9,296,270 B2* | 3/2016 | Parks | B60F 5/02 |
| 2011/0001016 A1* | 1/2011 | Skillen | B64C 3/40 |
| | | | 244/218 |
| 2015/0225072 A1* | 8/2015 | Torre | B64C 3/56 |
| | | | 244/49 |

* cited by examiner

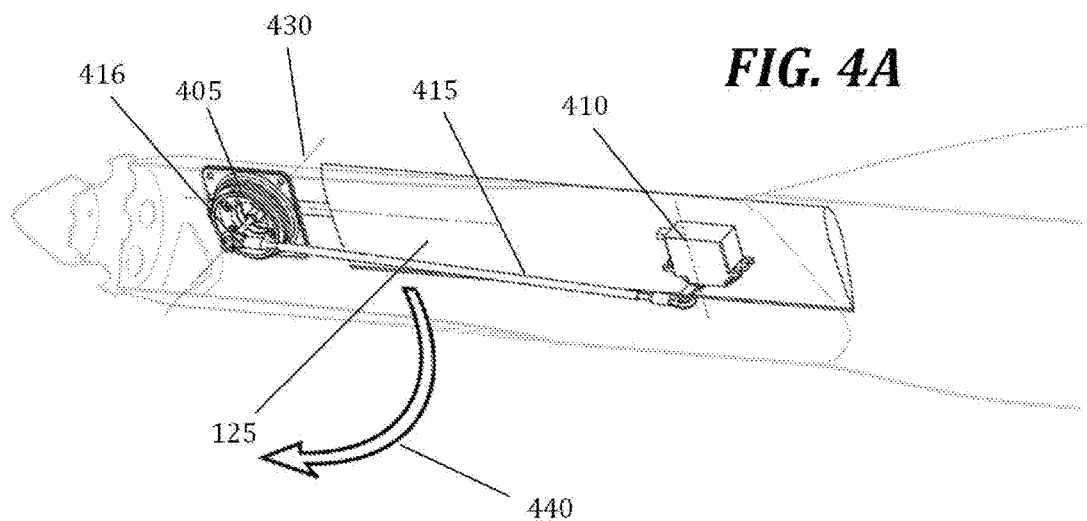
FIG. 4A
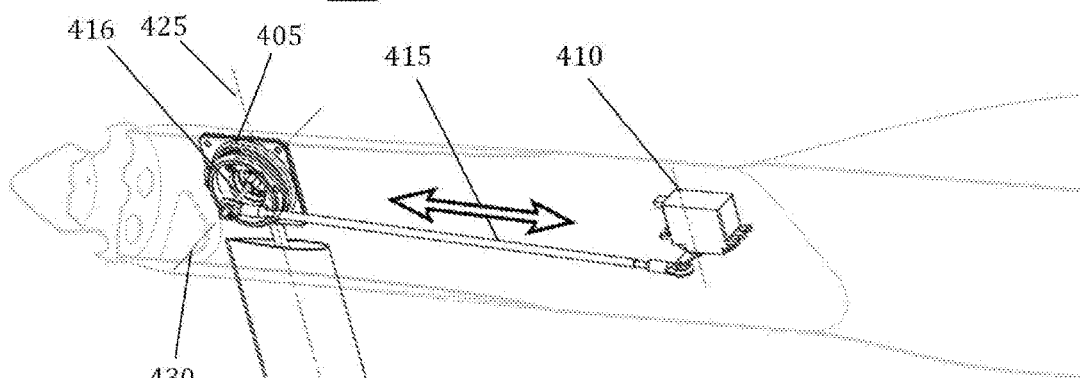
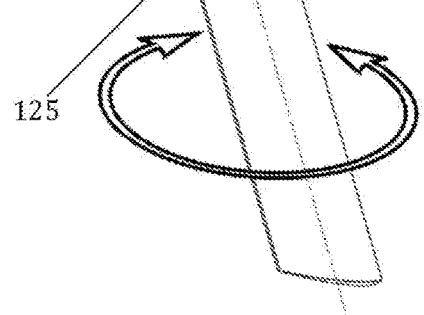
FIG. 4B

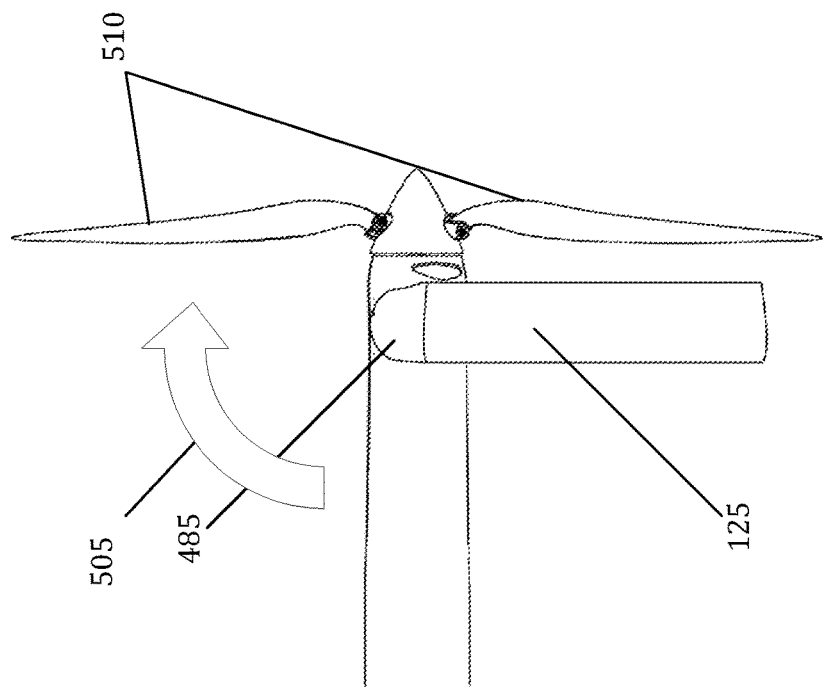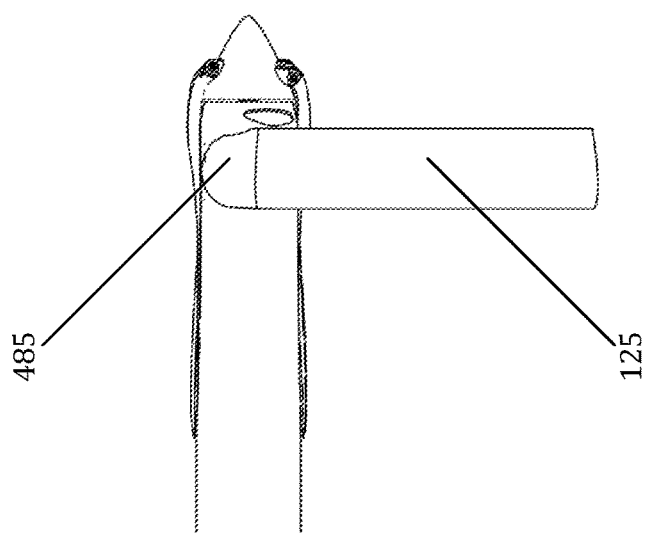
FIG. 5

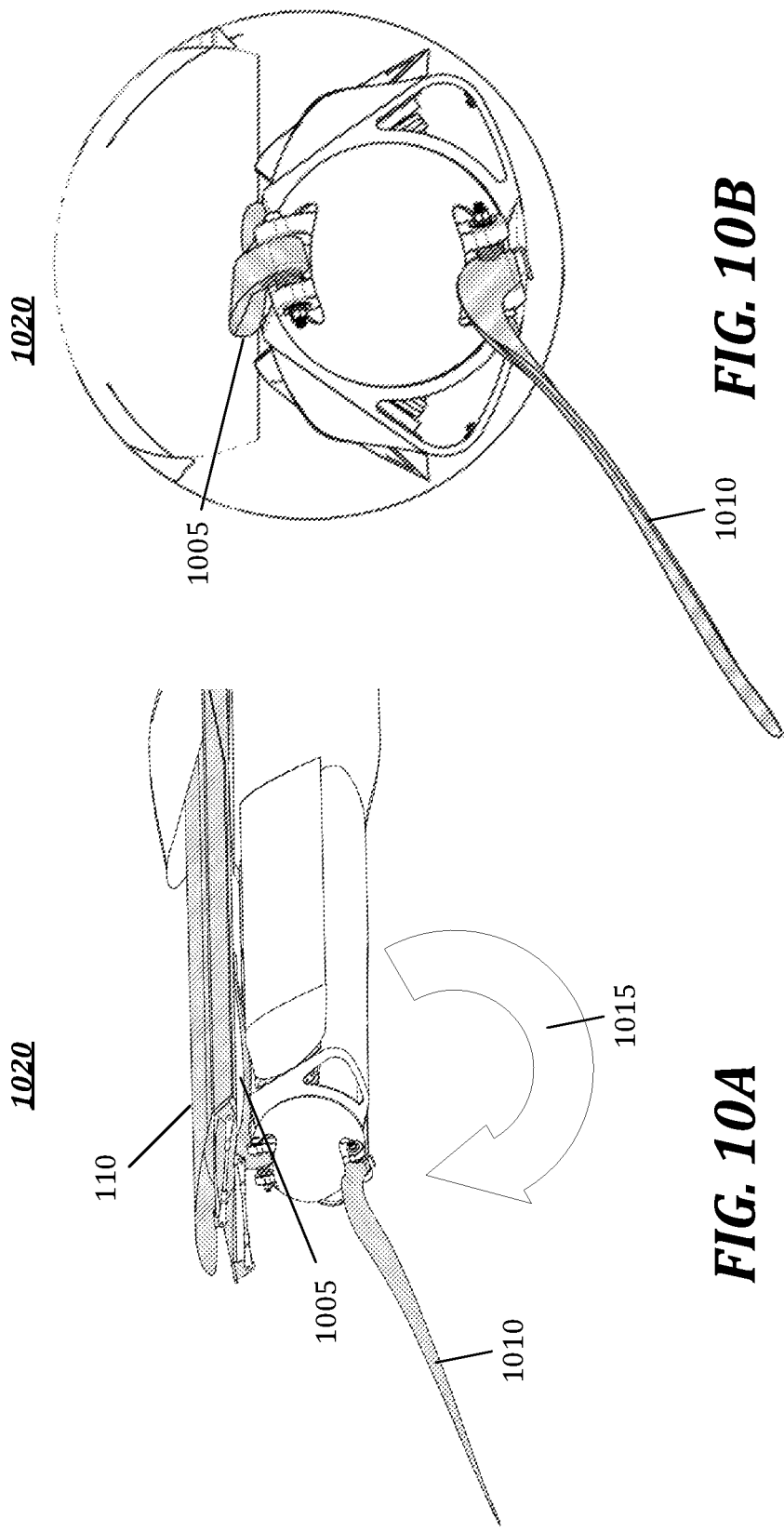

AERIAL VEHICLE WITH DEPLOYABLE COMPONENTS

RELATED APPLICATIONS

Under provisions of 35 U.S.C. §119(e), the Applicant claims the benefit of U.S. provisional application No. 62/254,098 filed Nov. 11, 2015, which is incorporated herein by reference.

Related U.S. patent application Ser. No. 15/092,219, filed on even date herewith in the name of Area-I Inc. and entitled "AERIAL VEHICLE WITH DEPLOYABLE COMPONENTS," is hereby incorporated by reference.

Related U.S. patent application Ser. No. 15/092,257 filed on even date herewith in the name of Area-I Inc. and entitled "AERIAL VEHICLE WITH DEPLOYABLE COMPONENTS," is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to unmanned aerial vehicles.

BACKGROUND

Unmanned aerial vehicles may be used for a plurality of applications. Such applications comprise commercial applications including surveillance and filming, and for military applications, reconnaissance and tactical missions. In certain circumstances, compact configurations can be beneficial to enabling particular types of missions. For example, compact configurations reduce space and enable various deployment options. However, current compact configurations are limited in flight range, endurance, and payload capacity.

BRIEF OVERVIEW

Embodiments of the present disclosure provide an improved aerial vehicle with deployable components. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

An unmanned aerial vehicle with deployable components (UAVDC) is disclosed. The UAVDC may comprise a fuselage, at least one wing, and at least one stabilizer. In some embodiments, the UAVDC may further comprise a propulsion means and/or a modular payload. The UAVDC may be configured in a plurality of arrangements. For example, in a compact arrangement, the UAVDC may comprise the at least one wing stowed against the fuselage and the at least one stabilizer stowed against the fuselage. In a deployed arrangement, the UAVDC may comprise the at least one wing deployed from the fuselage and the least one stabilizer deployed from the fuselage. In an expanded arrangement, the UAVDC may comprise the at least one wing telescoped to increase a wingspan of the deployed arrangement.

In various embodiments, a UAVDC with a telescoping wing system may be provided. The telescoping wing system may comprise a first wing section comprising a substantially hollow interior, a second wing section configured to be stowed within the interior of the first wing section. The second wing section may comprise an actuator configured to drive a belt coupled to the internal surface of the first wing section such that, upon actuation, a displacement of the attached segment of the belt causes the first wing section to traverse at least a portion of a length of the second wing section.

In the first configuration, the first wing section and the second wing section may form a first wingspan in a first arrangement, the first arrangement comprising the second wing section stowed within the interior of the first wing section. In a second configuration, the first wing section and the second wing section may form a second wingspan in a second arrangement, the second arrangement comprising the first wing section displaced along at least a portion of the length of the second wing section.

Still consistent with embodiments of the present disclosure, the UAVDC may comprise a fuselage, and at least one stabilizer configured to pivot about a first axis and a second axis. The at least one stabilizer may be configurable in at least the following arrangements: a compact arrangement comprising, wherein the at least one stabilizer is stowed against the fuselage, and a deployed arrangement, wherein the least one stabilizer is deployed from the fuselage by pivoting about the first axis.

The UAVDC may further comprise a pushrod configured to pivot the at least one stabilizer about the second axis. In some embodiments, the UAVDC may comprise a flexible fairing at the base of the stabilizer configured to enable the stabilizer to pivot about second axis while maintaining an aerodynamic efficiency.

In yet further embodiments, the UAVDC may comprise a fuselage comprising a modular payload section; at least one wing configurable in a first arrangement and a second arrangement, wherein the first arrangement comprises the at least one wing stowed against the fuselage, and wherein the second arrangement comprises the wings deployed for flight at a first deployment angle; a fairing positioned relatively at a base of the at least one wing, the fairing being constructed of a flexible material comprising at least one slit and at least one cutout designed to enabling a sweeping of the at least one wing from the first arrangement to the second arrangement, the fairing being configurable in: a first configuration to accommodate the first arrangement, and a second configuration to accommodate the second arrangement; an actuator coupled to a sweeping gearbox configured to actuate the sweeping of the at least one wing from the first arrangement to the second arrangement As will be detailed below, it should be understood that a single wing may be comprised of two left and right wing sections (a first section and a second section). The two wing sections may, throughout the present disclosure, be referred to as two wings or two wing segments. Accordingly, in some embodiments, the two wings may stacked against the fuselage in the first arrangement, the stacked configuration comprising a top wing and a bottom wing with the top wing vertically offset from the bottom wing in the first arrangement. In yet further embodiments, at a transition from the first arrangement to the second arrangement, the two wings may be configured to telescope to expand a wing span in the second arrangement.

Embodiments of the present disclosure may further comprise at least one control surface (e.g. a stabilizer) configured to deploy from a first stabilizer configuration stowed against the fuselage to a second stabilizer configuration deployed for flight at a second deployment angle.

In some embodiments, deployment of the at least one stabilizer may employ at least one spring, wherein the at least one spring is configured to force the at least one stabilizer from the first stabilizer configuration to the second stabilizer configuration.

The UAVDC may further comprise a propulsion mechanism. In some embodiments, the propulsion mechanism may comprise a propeller, wherein the propeller comprises at least one blade configured to fold into a first propeller arrangement and expand in a second propeller arrangement. The fuselage may comprise at least one groove configured to receive at least one blade of the propeller in the first propeller arrangement, and the propeller may be configured to unfold to the second propeller arrangement by means of at least one of the following: propeller blade springs, aerodynamic force, or a centripetal force from a rotation of the propeller.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 4A illustrates an example of stabilizers in a first configuration;

FIG. 4B illustrates an example of the stabilizers in a second configuration;

FIG. 5 illustrates an example of deployable propeller blades and a direction of deployment;

FIG. 10A illustrates a propeller blade confined by wings;

FIG. 10B illustrates a deployed propeller blade oriented with a free stream;

DETAILED DESCRIPTION

Figure 1A:
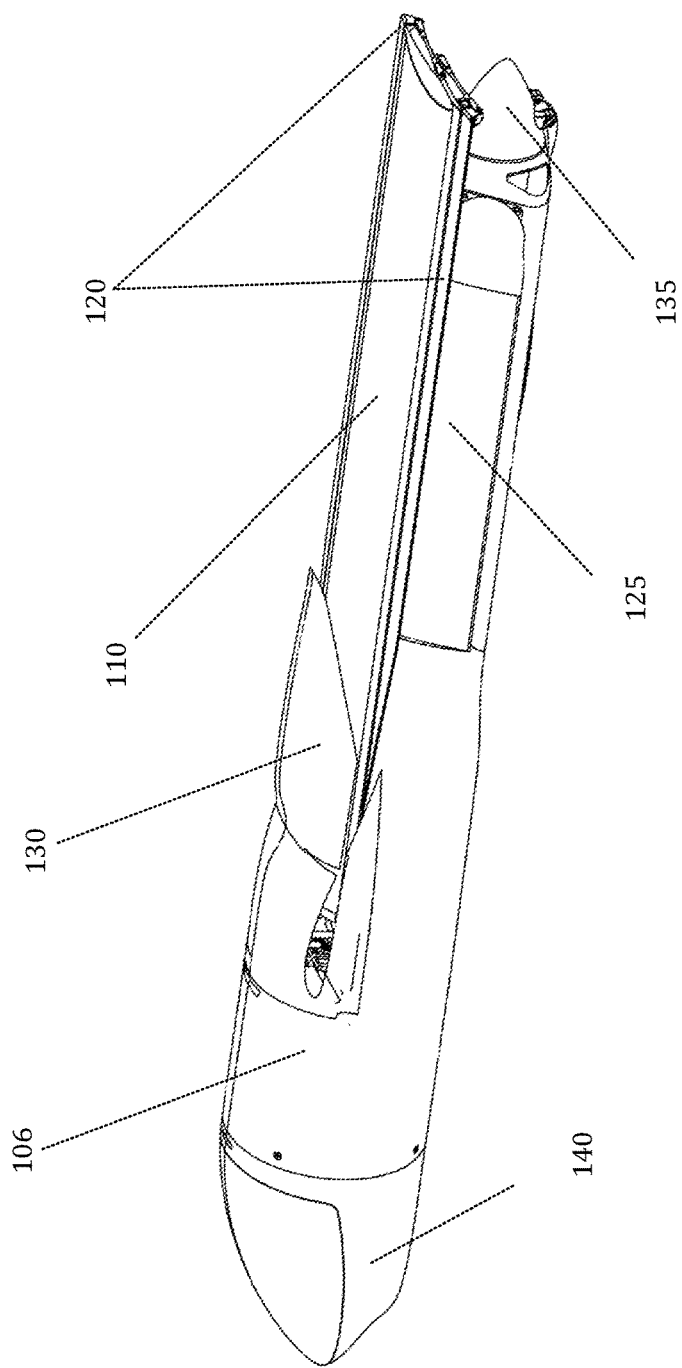
FIG. 1A illustrates an unmanned aerial vehicle with deployable components in a first configuration.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of unmanned aerial vehicles, embodiments of the present disclosure are not limited to use only in this context. For example, embodiments of the present disclosure may be employed on manned and unmanned aerial vehicles.

I. OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

An improved unmanned aerial vehicle with deployable components (UAVDC) is provided in the various embodiments disclosed herein. Various aspects of the UAVDC lead to improvements over conventional unmanned aerial vehicles, including, but not limited to, for example, improved portability, deployment, post-deployment transition to flight control, aerodynamic efficiency and flight endurance, payload capacity, and maximized mission capability over conventional unmanned aerial vehicles. As will be detailed below, the UAVDC of the present disclosure includes a number of features that lead to the aforementioned improvements, including, but not limited to, for example, trailing-edge hinged ailerons, deployable stabilizers, gearbox, fairing, and sweeping and telescoping wing implementations.

The UAVDC may be configured in a plurality of arrangements. A first configuration may be a compact arrangement suitable in, for example, storage and launching embodiments, while a second configuration may be a deployed arrangement suitable in, for example, launch recovery and flight, and a third configuration may be an expanded configuration suitable in, for example, high-endurance flight. As will be detailed below, the UAVDC may be fully functional and operable in intermediary configurations between these three configurations to provide some of the advantages of the improved UAVDC at higher airspeeds.

FIG. 1A illustrates an example of a first configuration (e.g., compact arrangement 102). Compact arrangement 102 may enable convenient storage and transportation of the UAVDC. In addition, compact arrangement 102 may enable certain launch methods, such as a launch from, for example, a tube or a release from, for example, an aircraft's weapons/bomb bay or wing attachment.

Consistent with embodiments of the present disclosure, the UAVDC may be deployed after launch into the deployed arrangement that is suitable to survive the high aerodynamic loads of launch recovery and high-speed flight. During the flight, the UAVDC may be further deployed into the expanded arrangement that is suitable for efficient, long-endurance flight. It should be understood that the term "deploy" and "deployment" may refer to the deployable components moving from one UAVDC configuration to another.

Figure 1B:
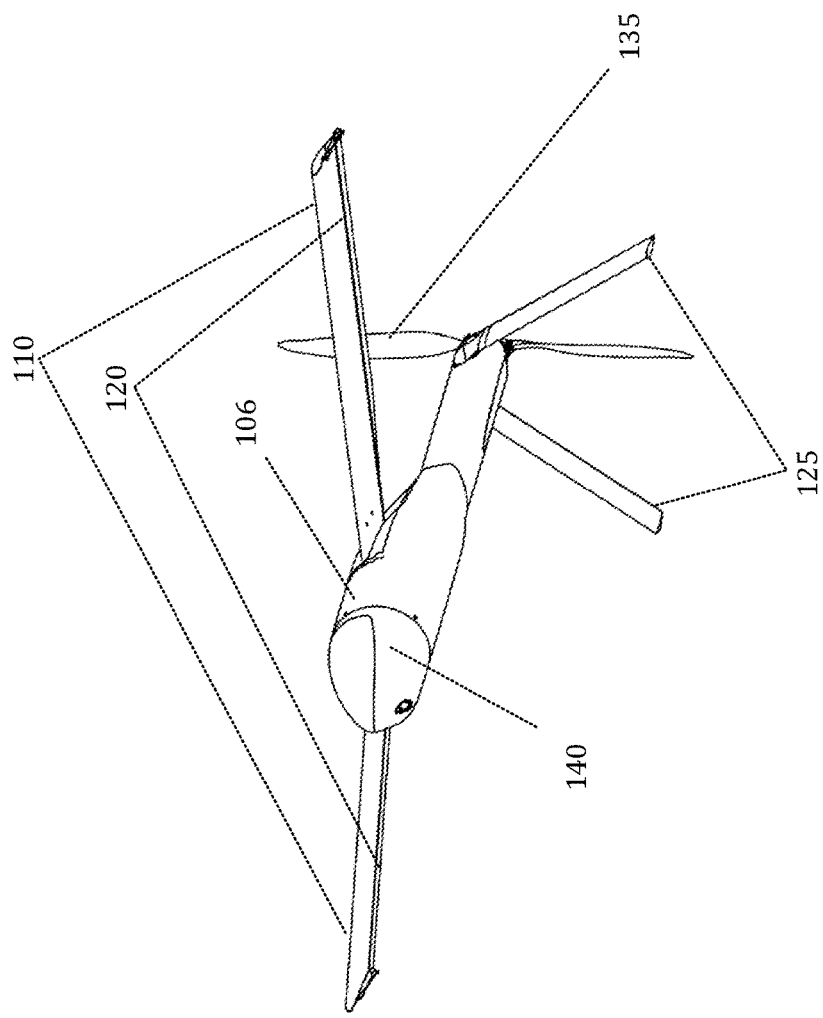
FIG. 1B illustrates the unmanned aerial vehicle with deployable components in a second configuration.

FIG. 1B illustrates an example of a second configuration (e.g. deployed arrangement 104). By using a deployed arrangement 104, embodiments may be able sustain the higher aerodynamics loads associated with flight at a high airspeed or high-g pull-up maneuvers. In this way, at least one of the intermediary configurations (e.g., the deployed arrangement 104) may be used in a launch recovery, wherein the UAVDC has been launched and has not slowed to an airspeed that the third configuration can sustain. Furthermore, the deployed arrangement may be able to sustain high-speed flight more efficiently than the expanded arrangement.

Figure 1C:
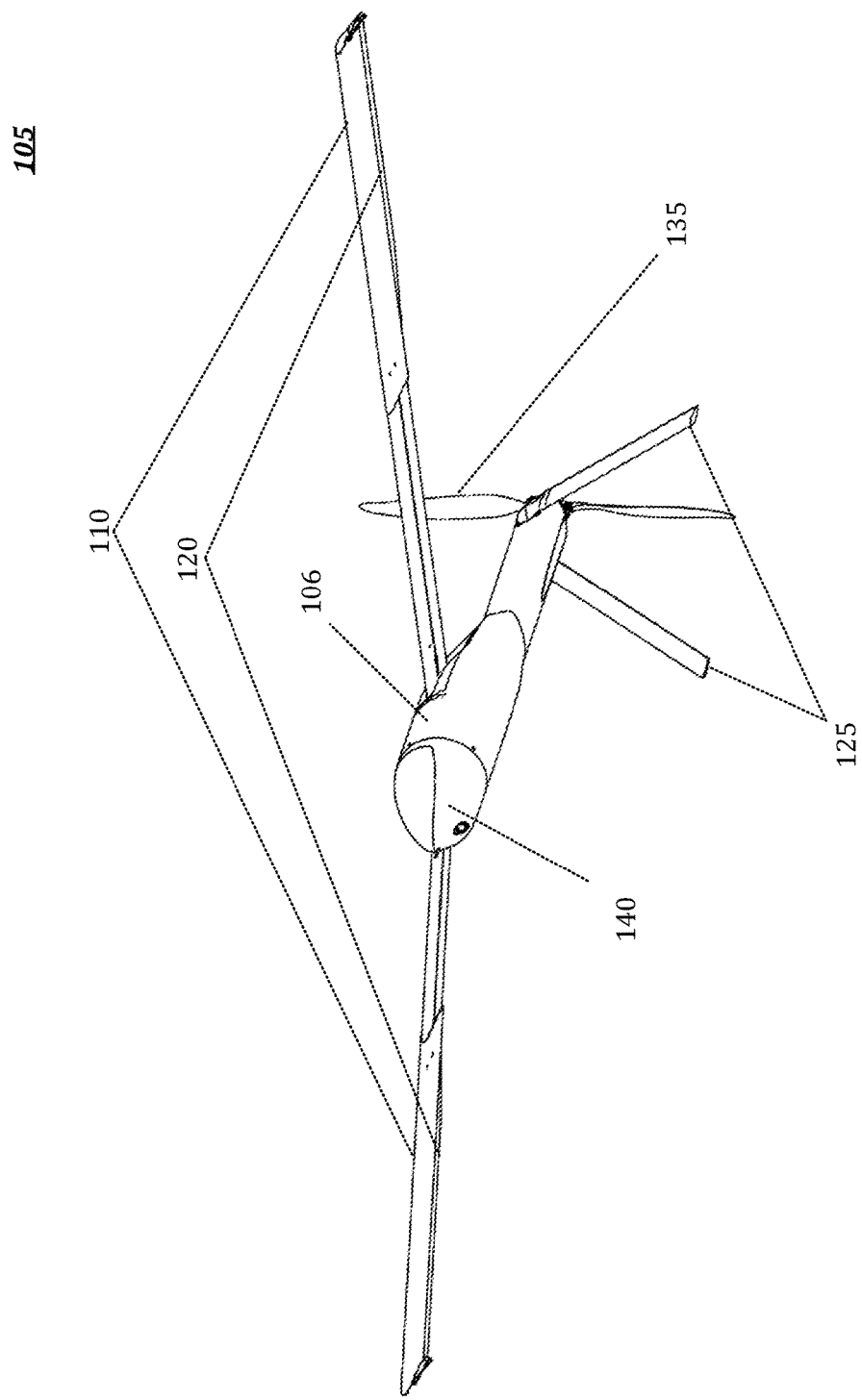
FIG. 1C illustrates the unmanned aerial vehicle with deployable components in a third configuration.

FIG. 1C illustrates an example of a third configuration (e.g., an expanded arrangement 105). By using the expanded arrangement the UAVDC may be able to achieve an increased level of aerodynamic efficiency (i.e. flight endurance) as well as an increased payload weight capacity. In various embodiments, the second configuration (e.g., deployed arrangement 104) and the third configuration (e.g., expanded arrangement 105) may be referred to as a common arrangement, but having wingspans that depend on the extent of the telescoped displacement of the wings.

As will be detailed below, during transformation from compact arrangement 102 to expanded arrangement 105, a UAVDC consistent with embodiments of the present disclosure may implement, but not be limited to, at least one of the following: wings 110 that may be configured to sweep and/or telescope, one or more trailing-edge hinged control surfaces that enable roll control ("ailerons") 120, one or more fold-away actuating stabilizers 125, one or more flexible aerodynamic fairings 130, one or more propulsion mechanisms (e.g., fold-away propeller 135), and a modular payload 140.

In further embodiments, the UAVDC may comprise intermediary configurations between the first configuration and second configuration or the second configuration and the third configuration. In the intermediary configurations, wings 110 may be at various stages of sweep or telescoping. It should be understood that the use of trailing-edge ailerons 120 and externally telescoped outer wing panels 310 may enable the UAVDC to continuously maintain controlled flight during transitions from the first configuration to the third configuration.

Figure 2A:
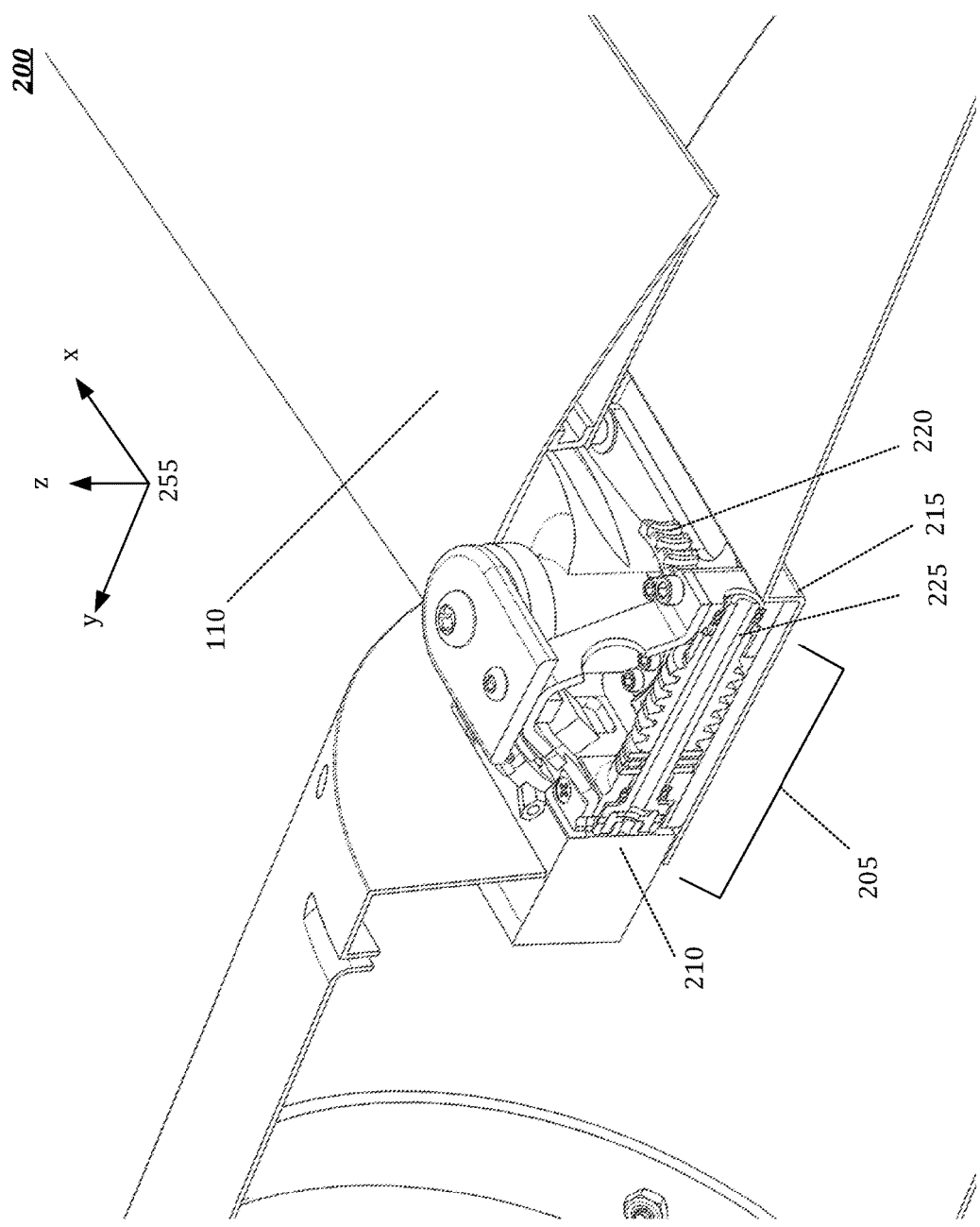
FIG. 2A illustrates a cut-away view of a sweeping gearbox coupled to an actuator.
Figure 2B:
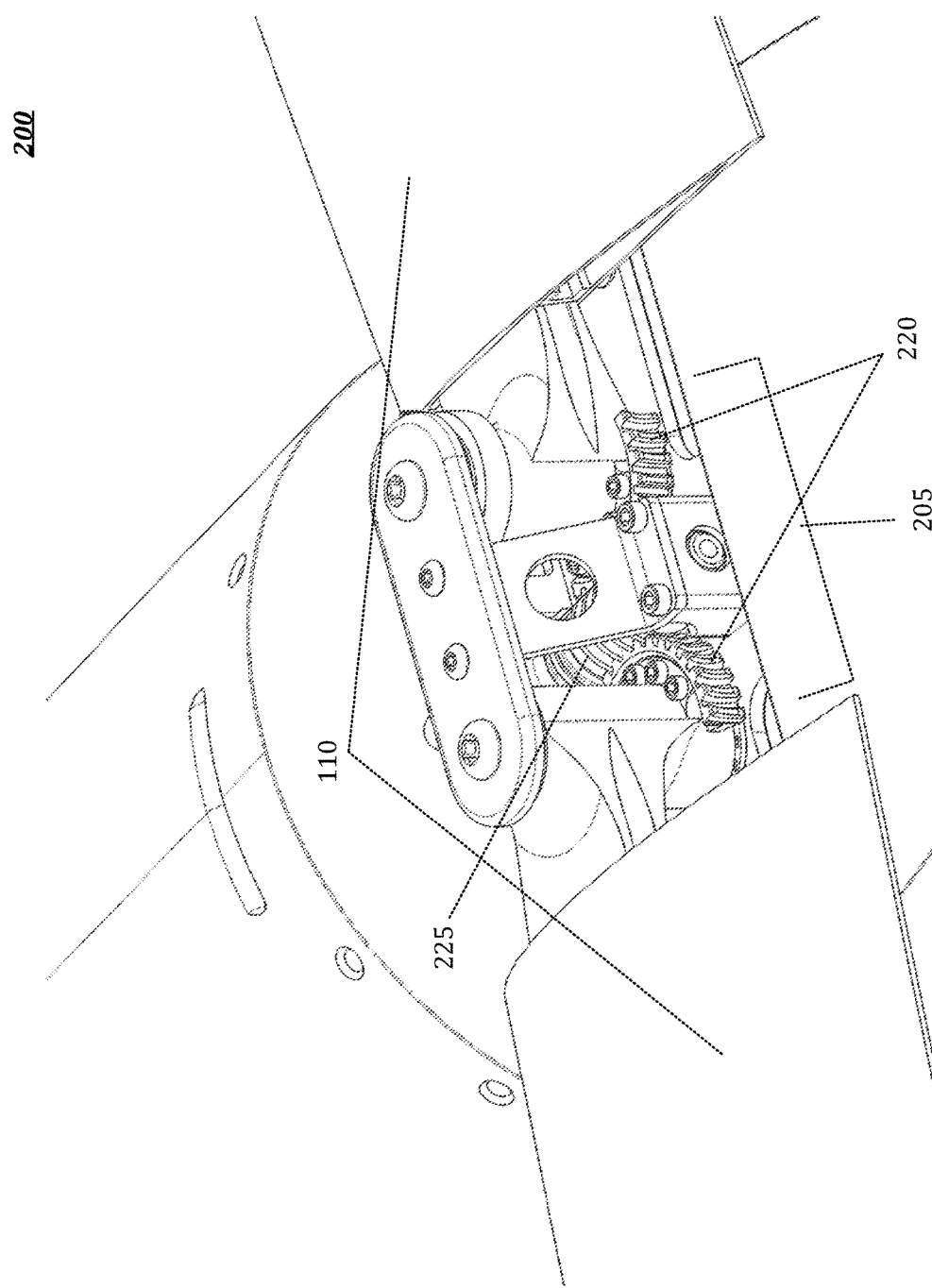
FIG. 2B illustrates a view of the sweeping gearbox.
Figure 2C:
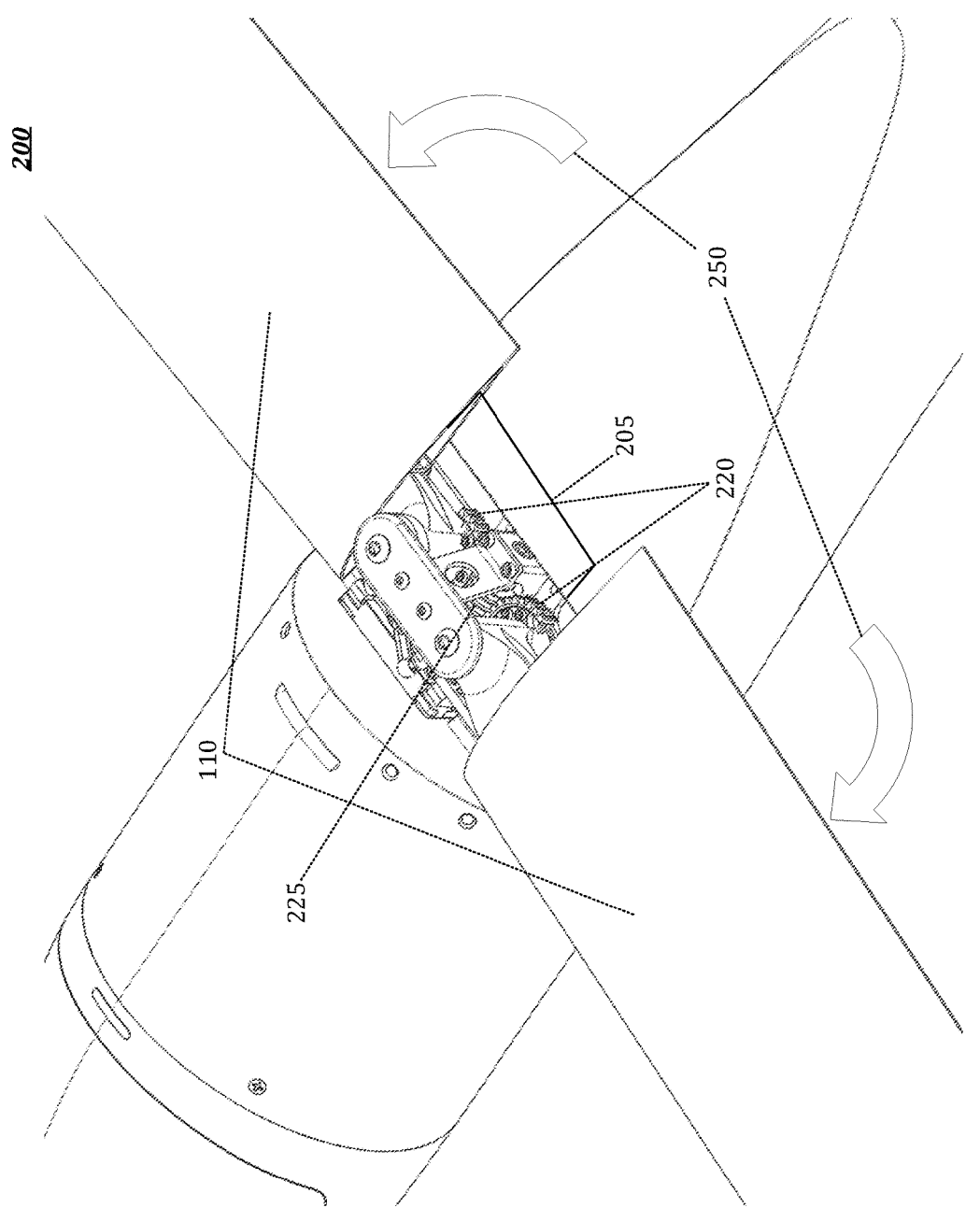
FIG. 2C illustrates another view of the sweeping gearbox and a direction of wing sweeping.
Figure 11A:
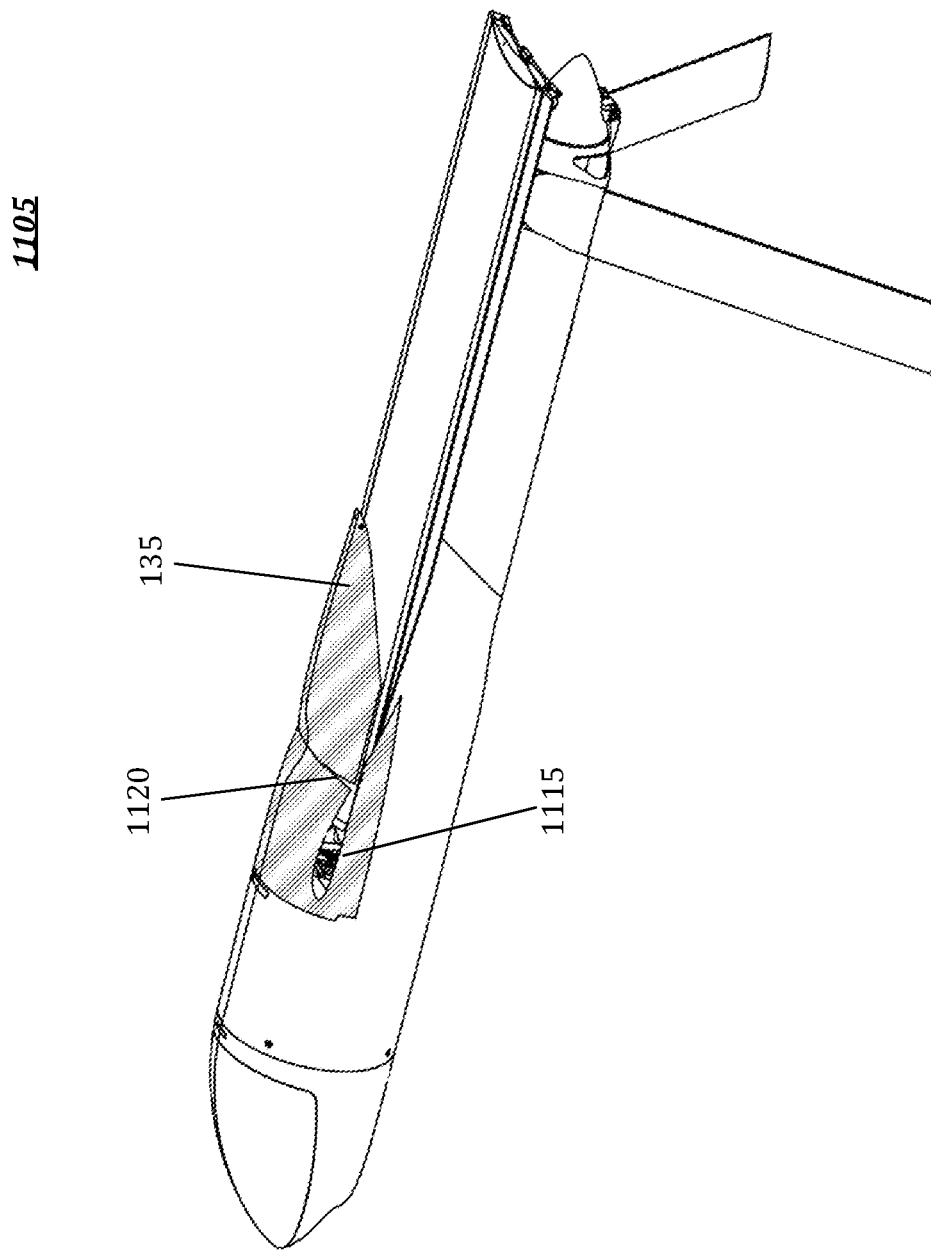
FIG. 11A illustrates a fairing in a first configuration.
Figure 11B:
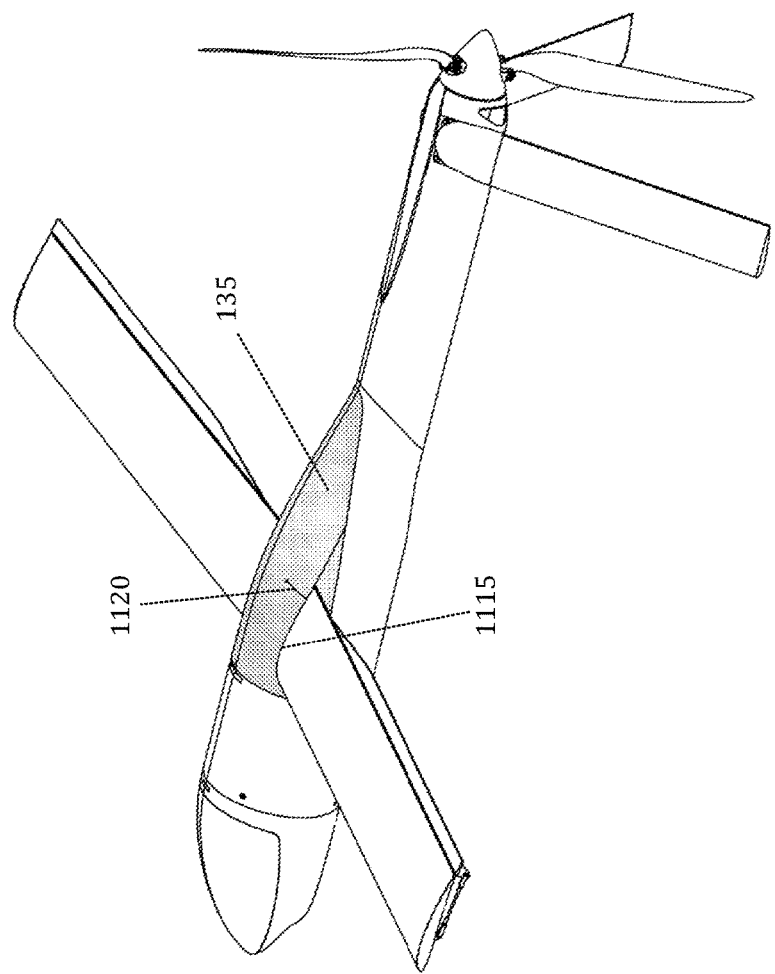
FIG. 11B illustrates the fairing in a second configuration.

In the first configuration, prior to deployment, the aforementioned wings 110, stabilizers 125, and propeller 135 may be stowed against a fuselage 106 of the UAVDC (i.e., folded and out of the way during vehicle launch). Fairing 130 may flex to accommodate wings 110 in their stowed configuration and then be configured to flex in a way so as to accommodate a sweeping motion of wings 110. Once launched, the UAVDC may transform from the first configuration into the second configuration. In the second configuration, wings 110 may be deployed by way of an outward sweeping motion (with fairing 130 flexing in a way to enable the sweeping motion). FIG. 2C illustrates an outward sweeping motion 250. As will be further detailed below, outward sweeping motion 250 may be enabled by, but not limited to, for example, a sweeping gearbox coupled to an actuator. FIGS. 2A-2C illustrate an example of a sweeping gearbox 205 coupled to an actuator 210. Further, sweeping motion 250 of wings 110 may enable configurable wing angles to optimize aerodynamics. Fairing 130 may be designed to accommodate wings 110 in the stored configuration as well as sweeping motion 250. Further, fairing 130 may close around wings 110 in order to maintain the aerodynamic integrity of the UAVDC, as shown in FIG. 11B.

By implementing a gearbox 205 configured to sweep wings 110 as well as orient wings 110 with optimal dihedral angles 265 and angles of incidence 275, embodiments of the present disclosure may provide improvements over conventional systems. For example, in conventional systems, aircrafts that implement sweeping wings and wing angle adjustments require use of secondary mechanics to orient the wing angles. Such secondary mechanics add to weight and cost, as well as provide additional modes of failure.

Figure 3:
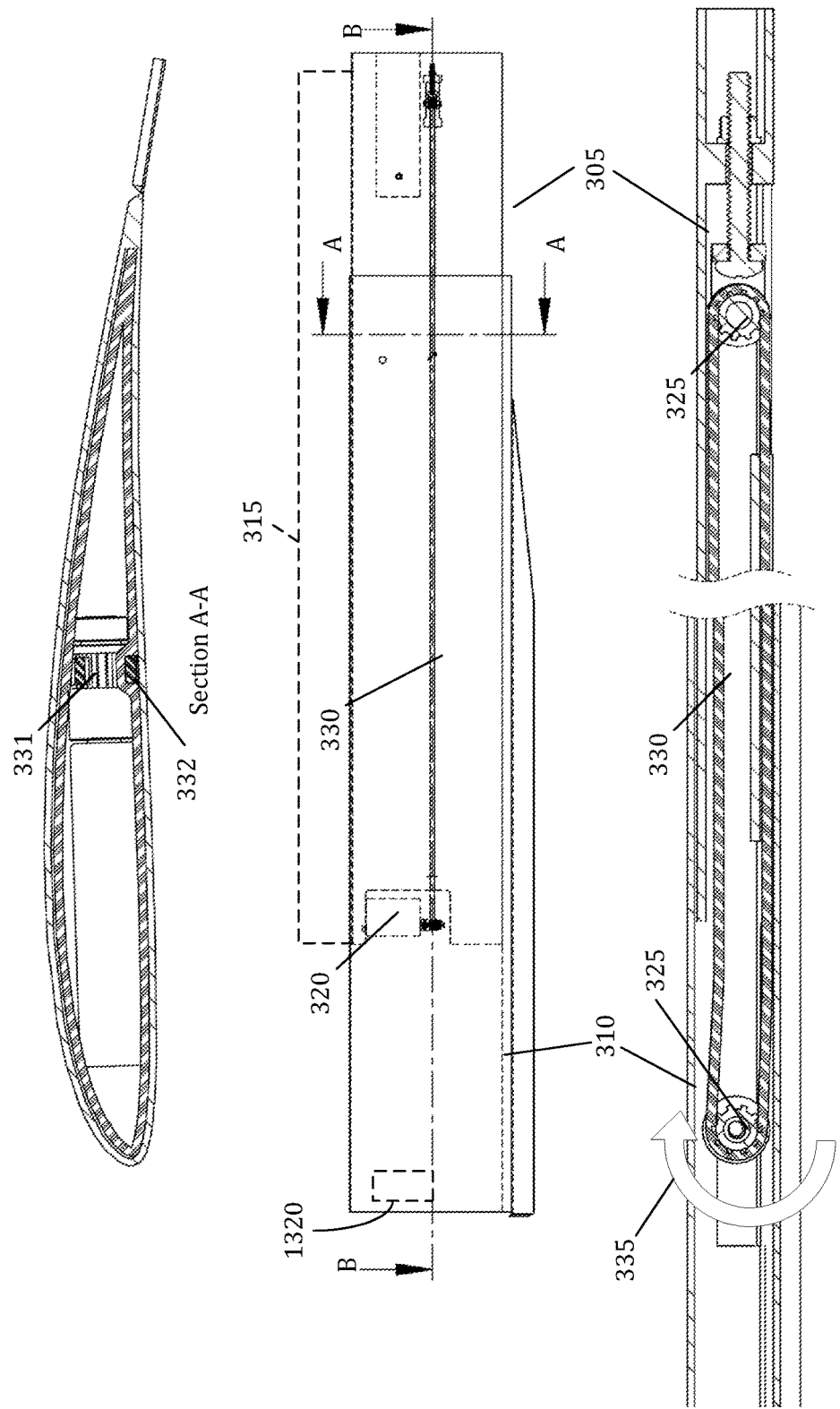
FIG. 3 illustrates an example of telescoping wings.

Still consistent with embodiments of the present disclosure, wings 110 may further be configured to telescope (i.e., expand in length) in the third configuration. Such telescoping wings may comprise a fixed inner section and one or more substantially hollow outer sections that slide along adjacent sections to provide a longer wingspan once deployed. FIG. 3 illustrates an example of telescoping wings 110 comprising a fixed inner section 305 that attaches to fuselage 106 and an outer section 310. In further embodiments, a plurality of nested outer wing sections may be implemented. In this way, wings 110 may be stored in a compact arrangement 102 and later extend (i.e., telescope) to provide additional lift during the expanded arrangement 105. As will be detailed below, a telescoping mechanism ("telescoping means") consistent with embodiments of the present disclosure may employ, for example, a belt system 315, a scissors mechanism, or a piston mechanism to extend and/or retract the wings.

The telescoping means consistent with embodiments of the present disclosure enable a maximized wing span while maintaining roll control throughout the transition between configurations. For example, as the inner section is fixed, the outer sections may comprise a substantially hollow interior so as to enable the fixed inner section to reside within the interior of the outer section. The outer section may then slide outwards (i.e., telescopes), away from fuselage 106, thereby exposing the fixed inner section as it telescopes. The trailing-edge mounted control surfaces (e.g., ailerons 120) are mounted to the outer section and are therefore exposed and operable throughout the deployment and telescoping process; in this way, the wingspan of the UAVDC can expand while continually maintaining controlled flight during the transition (e.g., regardless of the outer section position relative to the inner section position).

In some embodiments, inner section 305 connects to the fuselage 106, while outer section 310 may be telescoped outward from fuselage 106. Trailing-edge ailerons 120 may connect to outer section 310 to enable roll control. In this way, trailing-edge ailerons 120 may provide roll control even when wings 110 are not extended. Trailing-edge ailerons 120 may be connected by a hinge at a rear-most point of the wing in order to maximize an internal volume of the outer section 310, which, in turn, maximizes the overall span of the wing 110 in its third configuration. In various embodiments, other configurations of wing control surfaces, such as spoilers, may be implemented within the spirit and scope of the present disclosure.

By implementing hollow outer telescoping wing section 310 and trailing-edge hinged aileron 120, a plurality of improvements are introduced. A typical telescoping wing utilizes telescoping outer panels that are stored within the fixed inner panel, this precludes the use of ailerons mounted to the outer panels until the wing panels reach a telescoped state. Furthermore, conventional aileron implementations are configured within the wing surface itself, thereby reduce the amount of internal volume available in the wing. The reduced internal volume decreases the available depth of an interior wing section placement in a telescoping wing system, thereby leading to a smaller displacement in a telescoped configuration. In this way, conventional roll control surfaces may reduce the final length of a telescoped wing.

Attaching trailing-edge hinged ailerons 120 to the outer section 310 of the telescoping wing 110 enables the inner section 305 of telescoping wing 110 to be stowed further within the interior of outer section 310 while still providing the necessary roll control to maintain flight in the deployed arrangement, before the wings are telescoped. In turn, when wings 110 are telescoped, the displacement of the outer section 310 is increased by a range greater than that of other telescoping wing systems, thereby leading to the benefits of increased wingspan over a conventional aerial vehicle capable of compact configurations. Further still, extending outer section 310 of the telescoping wing 110 from the fuselage further enables the trailing-edge hinged ailerons 120 to provide increased roll control of the UAVDC.

Consistent with embodiments of the present disclosure, the control surfaces (e.g., trailing-edge hinged ailerons 120) may be operable in all of the UAVDC's configurations. That is, the control surfaces may be operable in the compact arrangement 102, the deployed arrangement 104, and in the expanded arrangement 105. Furthermore, the control surfaces may be operable during the transitionary phases between each of those arrangement.

For example, trailing-edge hinged ailerons 120 may be operable in between the first configuration (e.g., compact arrangement 102) and the deployed arrangement 104 (e.g., engaged in operation at approximately a 45-degree sweep) in order to provide post-launch stabilization for the UAVDC. Moreover, trailing-edge hinged ailerons 120 may be operable when the UAVDC is in the deployed arrangement 104 to provide flight control, as well as the transitionary stage between the deployed arrangement 104 and the expanded arrangement 105. Finally, trailing-edge hinged ailerons 120 may be operable in the expanded arrangement 105 to provide additional, more effective flight control.

Figure 4C:
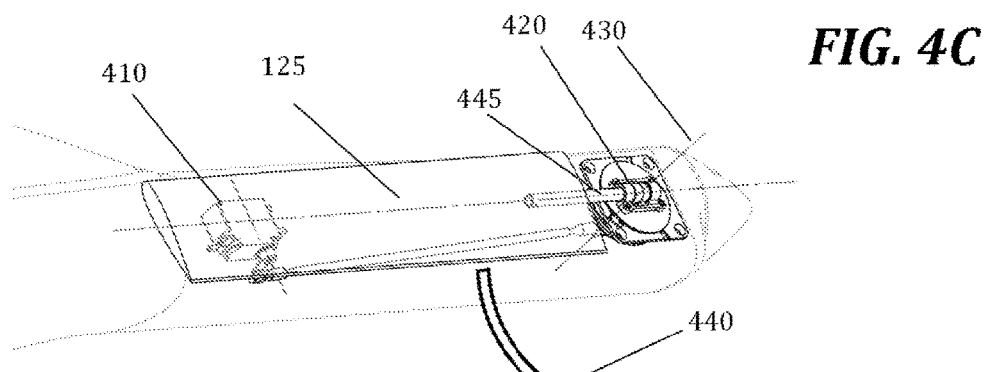
FIG. 4C illustrates another view of the stabilizers in the first configuration.
Figure 4D:
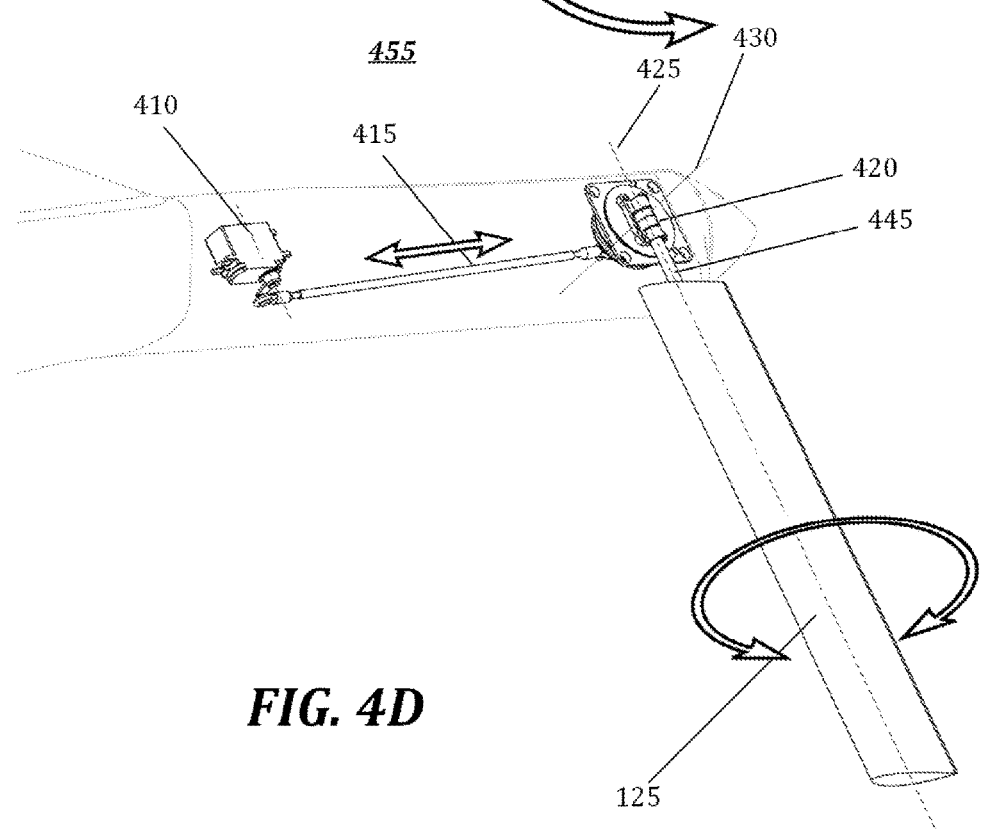
FIG. 4D illustrates another view of the stabilizers in the second configuration.
Figure 4E:
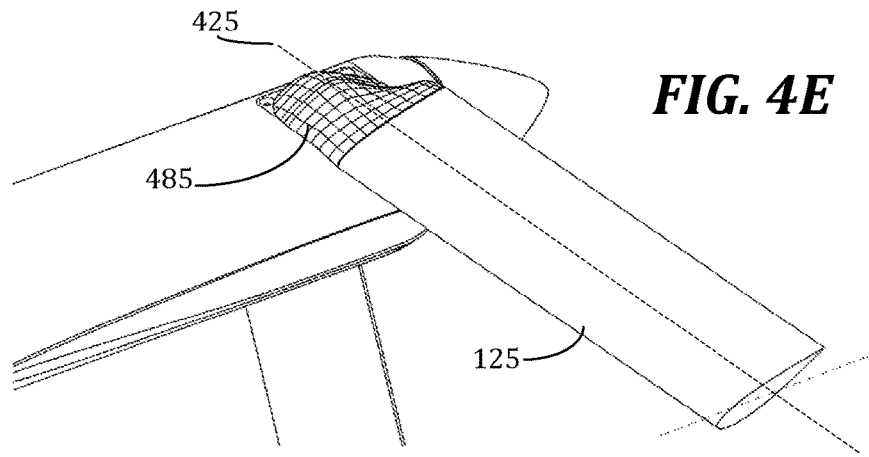
FIG. 4E illustrates an example of stabilizers in a first pivot angle.
Figure 4F:
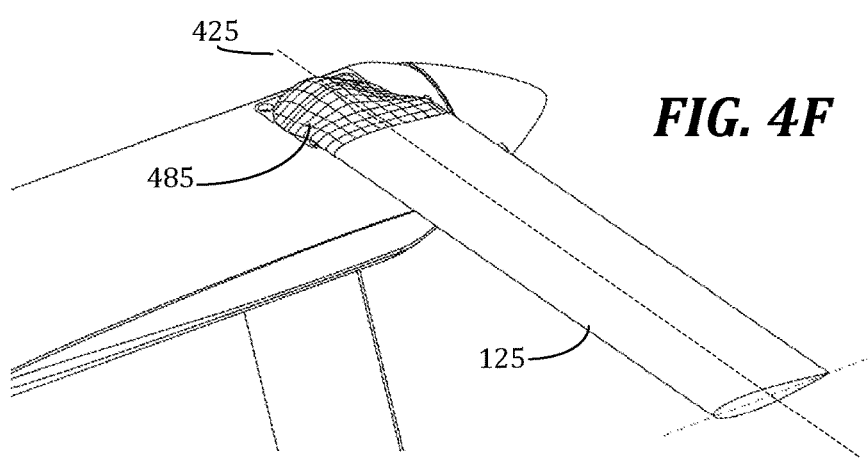
FIG. 4F illustrates an example of stabilizers in a second pivot angle.
Figure 4G:
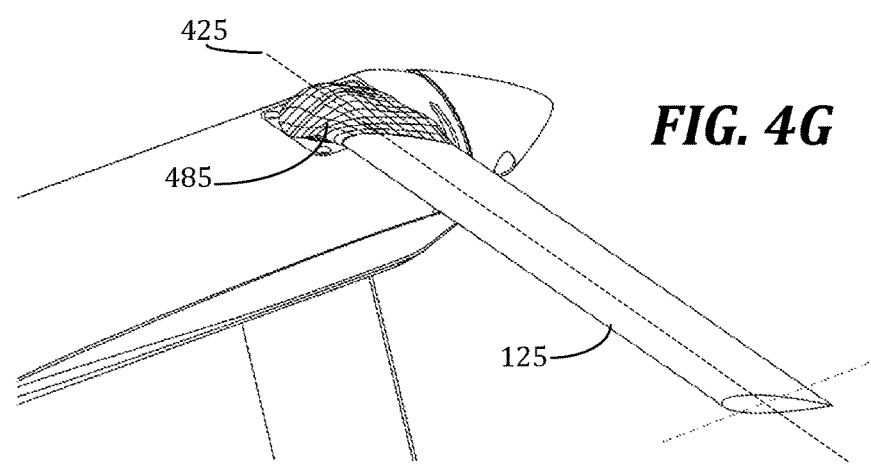
FIG. 4G illustrates an example of stabilizers in a third pivot angle.

One or more stabilizers 125 of the UAVDC may be deployed in the intermediary configurations, second configuration, and/or the third configuration. Stabilizers 125 may deploy from a first stabilizer configuration 450 to a second stabilizer configuration 455 by rotating about axis 430, as shown in FIGS. 4A-4D. Once in the second stabilizer configuration 455, stabilizer 125 can further serve as a control surface, providing flight control by pivoting about axis 425. As will be detailed below, deployment about axis 430 may be implemented via, for example, pre-loaded springs 405. In further embodiments, stabilizers 125 may be deployed upon interfacing with air resistance. For example, when stabilizers 125 interface with an airstream, a resulting drag force may cause stabilizers 125 to move into a deployed configuration. Servos 410 may actuate the stabilizers 125 about axis 425 once stabilizers 125 are deployed. FIGS. 4E-4G illustrate the stabilizer 125 in the deployed configuration, at various pivot angle about axis 425.

Deployable control surfaces, embodied in the present disclosure as stabilizers 125, are improved over conventional systems, for example, by enabling automatic deployment without requiring controlling components (e.g., actuators and linkages) to adjust. Further, by implementing a flexible fairing, the aerodynamic efficiencies may be improved. It should be understood that not all embodiments of the UAVDC may comprise each of the aforementioned components, while other embodiments of the UAVDC may comprise additional components, and yet other embodiments still may comprise various combinations of the embodiments described in the present disclosure.

Propeller 135 of the UAVDC may deploy upon interfacing with the air resistance. In further embodiments, springs and/or centripetal force from a rotation of propeller 135 may be implemented in deploying propeller 135. FIG. 5 illustrates an example of propeller 135 and a direction of deployment 505 for propeller blades 510.

Figure 6A:
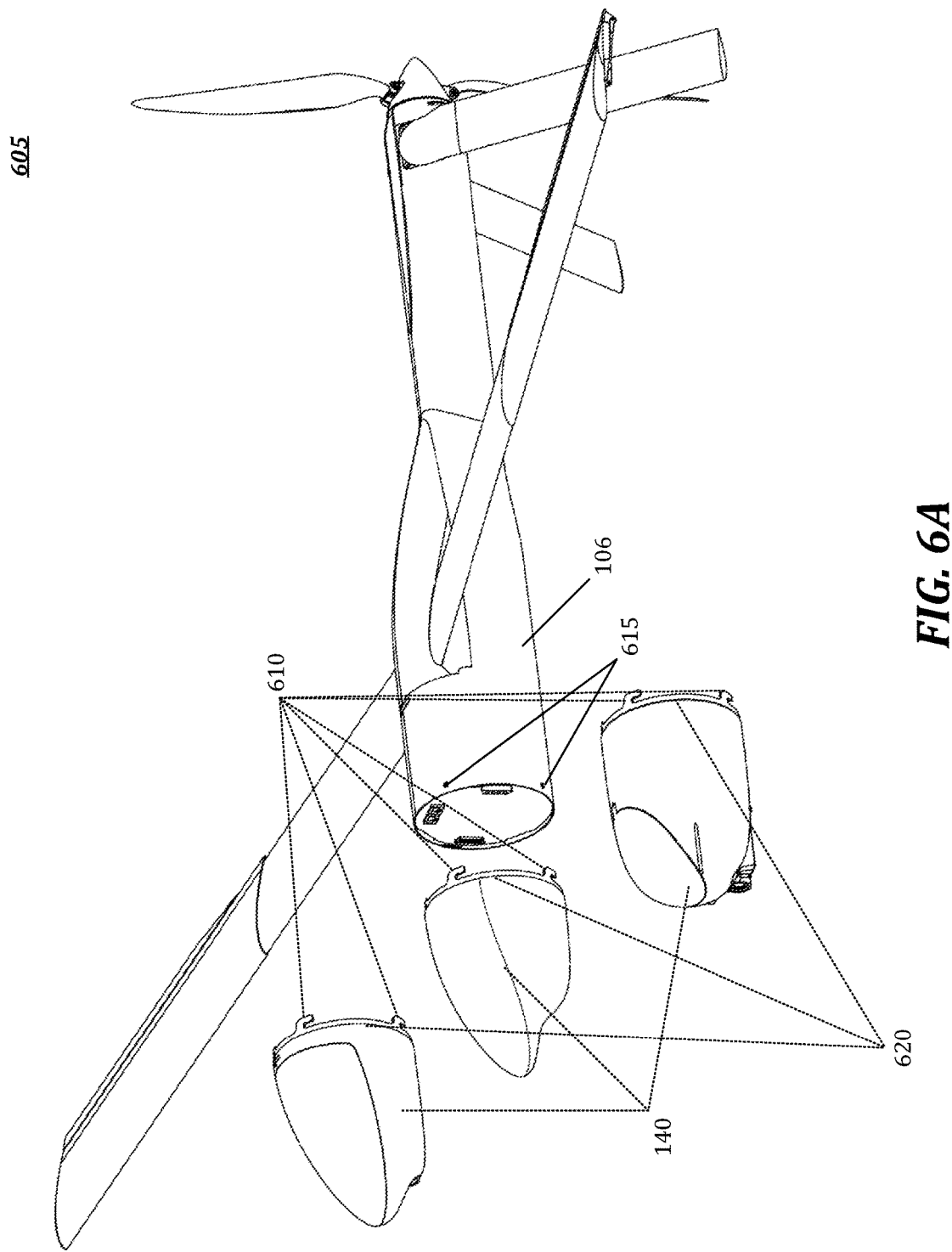
FIG. 6A illustrates an example of a modular payload.

A UAVDC consistent with embodiments of the present disclosure may be configured to receive a modular payload 140. In some embodiments, modular payload 140 may remain fixed in both the first and second configuration. By way of non-limiting example, modular payload 140 may be configured into the UAVDC, serving as a nose of fuselage 106. FIG. 6A illustrates an example of a plurality of modular payloads 140 configured to be attached to fuselage 106 in a fixed position 605. To facilitate modularity, modular payload 140 may comprise hooks 610 configured to hook around pins 615 in a twist-to-lock fashion. In this way, modular payload 140 may be inserted into fuselage 106. A ridge 620 may orient modular payload and provide a flush transition from modular payload 140 to fuselage 106. Further, pins 615 may comprise screw threads to tighten around a nut, thus securing hooks 610, and accordingly, modular payload 140, in place. In further embodiments, modular payload 140 may comprise protrusions that are configured to fit into slots embedded within fuselage 106. Modular payload 140 may be inserted into fuselage 106 along slots configured to receive the protrusions and turned to lock modular payload 140 to fuselage 106.

Figure 6B:
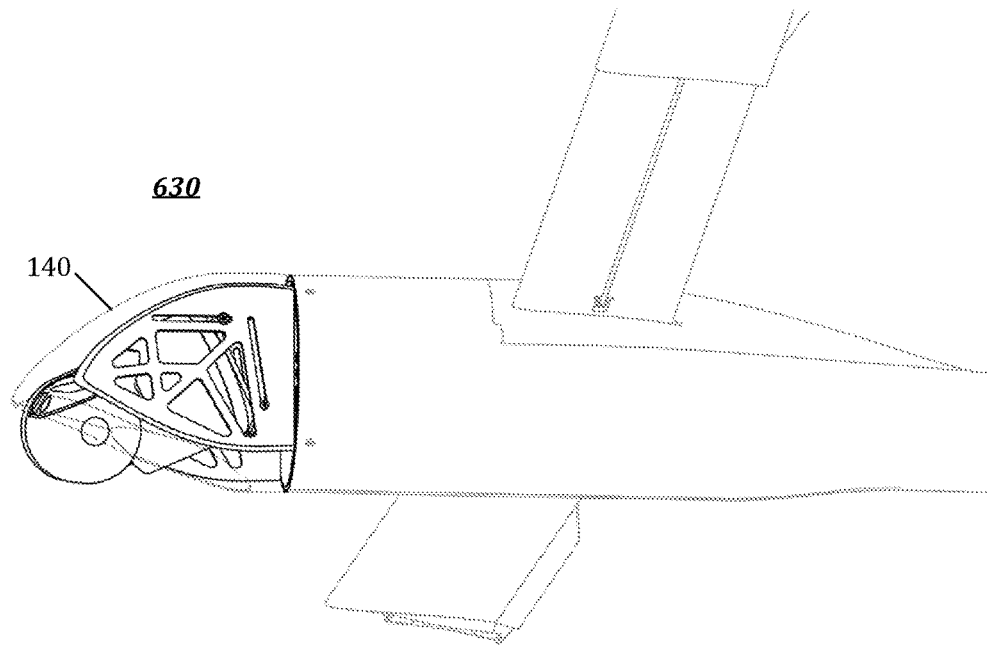
FIG. 6B illustrates an example of a modular payload with deployable components in a first configuration.
Figure 6C:
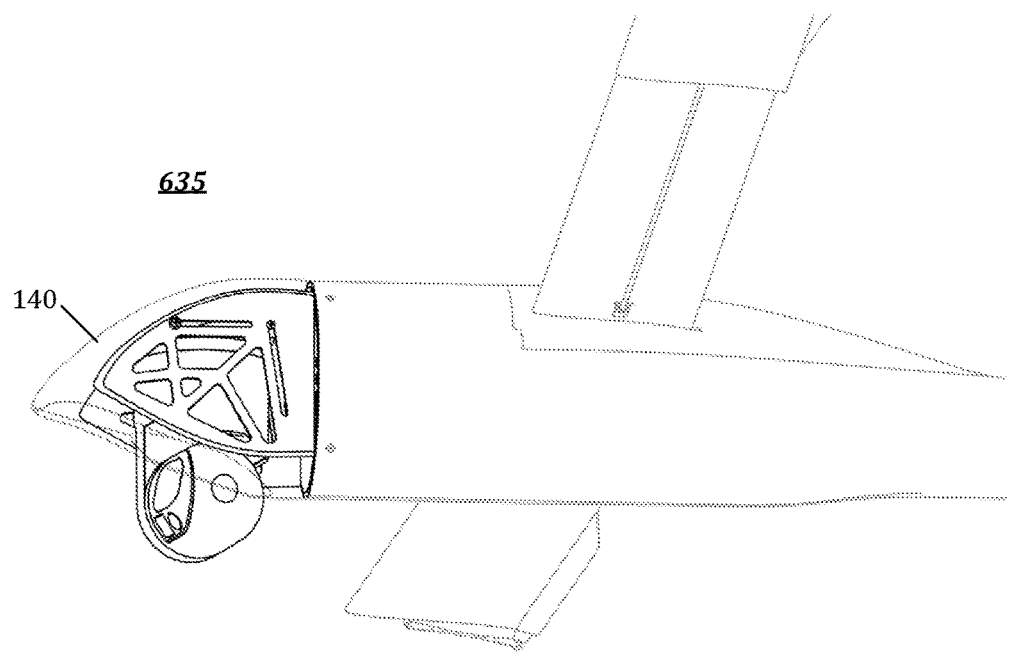
FIG. 6C illustrates an example of the modular payload with deployable components in a second configuration.

While modular payload 140 may be locked in a fixed position 605, it may comprise deployable components within, as shown in FIGS. 6B and 6C, illustrating modular payload in a first configuration 630 and a second configuration 635, respectively.

Figures 6D, 6E:
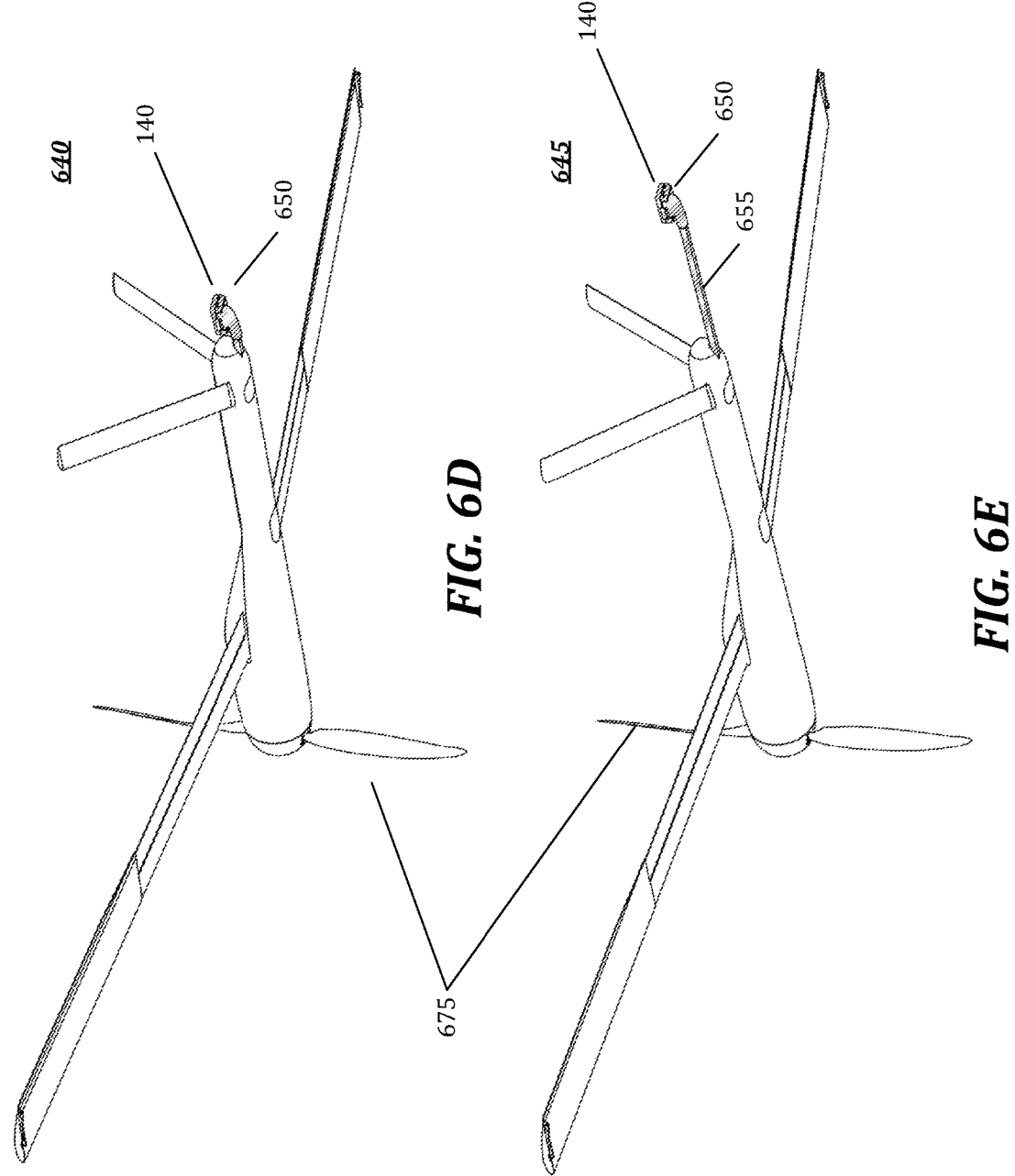
FIG. 6D illustrates an example of another modular payload in a compact configuration.
FIG. 6E illustrates an example of the modular payload in a deployed configuration.

In other embodiments, modular payload 140 may have at least two configurations for location with respect to fuselage 106. FIG. 6D illustrates another example of a modular payload 140 in a first position 640; FIG. 6E illustrates modular payload 140 in a second position 645. For example, modular payload 140 may be arranged in first position 640 when the UAVDC is in the first configuration ("compact configuration"), and deployed into a second position 645 while in the second configuration. By way of non-limiting example, the modular payload may be a sensing device 650 configured to a boom 655 telescoping out of the fuselage.

Embodiments of the present disclosure may provide improvements over conventional unmanned aerial vehicles including, but not limited to the following examples:

Improved aerodynamic efficiency which increases flight endurance;

Increased payload capacity;

Launch and transition to flight without the assistance of external aerodynamic treatments such as a parachute or balloon; and Maximized mission capability (i.e. its modular payload and reconfigurable and highly efficient airframe enable the UAVDC to efficiently perform a wider array of missions such as, for example, but not limited to, Intelligence Surveillance Reconnaissance (ISR), Signals Intelligence (SIGINT), weather, geophysical, environmental, and the like.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. CONFIGURATION

FIG. 1C illustrates an UAVDC consistent with embodiments of the present disclosure. Embodiments of the present disclosure may comprise a fuselage 106, one or more antennas 705, power source 1310, wings 110 that may be configured to sweep and/or telescope, stabilizers 125, and payload 140. Further embodiments may comprise a propulsion mechanism, such as, for example, propeller 135.

Fuselage 106 may be comprised of, but not limited to, for example, carbon fiber. Further, fuselage 106 may be comprised of, but not limited to, for example, a composite material (e.g., fiberglass, Kevlar, Spectra). In various embodiments, plastics may be used, including, but not limited to 3D printed plastics. Fuselage 106 may take an aerodynamic configuration to facilitate speed and reduced air resistance.

Figure 7:
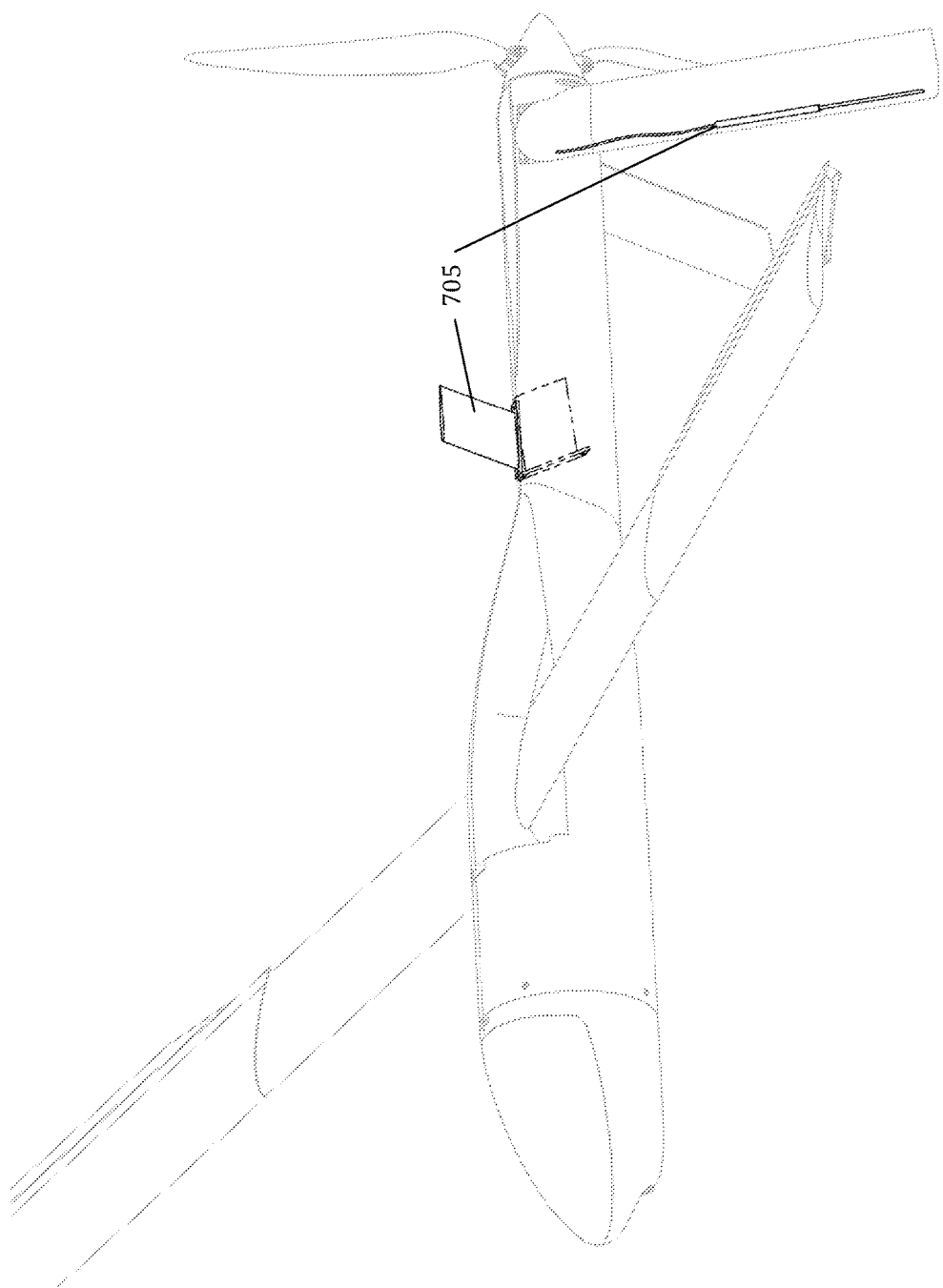
FIG. 7 illustrates potential positions for an antenna.

Referring now to FIG. 7, antenna 705 may be positioned in various portions of the UAVDC. For example, antenna 705 may be fixed, and, in some embodiments, may be conformal (i.e., built into the skin of fuselage 106). Alternatively, antenna 705 may be deployable. For example, antenna 705 may be configured to deploy out from the fuselage (e.g., via a spring) on a hinge. As another example, as illustrated in FIG. 7, antenna 705 may be built into at least one of stabilizers 125. In this way, when stabilizers 125 are deployed, antenna 705 may also be deployed. In further embodiments, and as illustrated in FIGS. 6D and 6E, modular payload 140 may be embodied as antenna 705. In this way, antenna 705 may be attached to boom 655 and configured to extend from fuselage 106. In yet further embodiments, a plurality of antennas may be integrated within the UAVDC.

Antenna 705 may be in operable communication with an on-board controller, as further detailed with reference to FIG. 15. In this way, antenna 705 may both send and receive data to and from a remote location (e.g., a UAVDC operator). For example, antenna 705 may be used to receive control signals from a remotely-located operator. The control signals may be processed and decrypted by the on-board controller, which, in turn, may operate the UAVDC accordingly. Furthermore, the antenna 705 may be used to communicate various data from the UAVDC to, for example, the remotely located operator.

Data may include, but not be limited to, for example, sensor data collected by various sensors on-board the UAVDC (e.g., sensors within modular payload 140). In yet further embodiments, the data may include telemetric data for the UAVDC, including, but not limited to, for example, global positioning data, accelerometer data, gyroscopic data, velocity data, and the like. In some embodiments, the aforementioned data may be collected, processed, and encrypted by the on-board controller prior to its communication.

Figure 8:
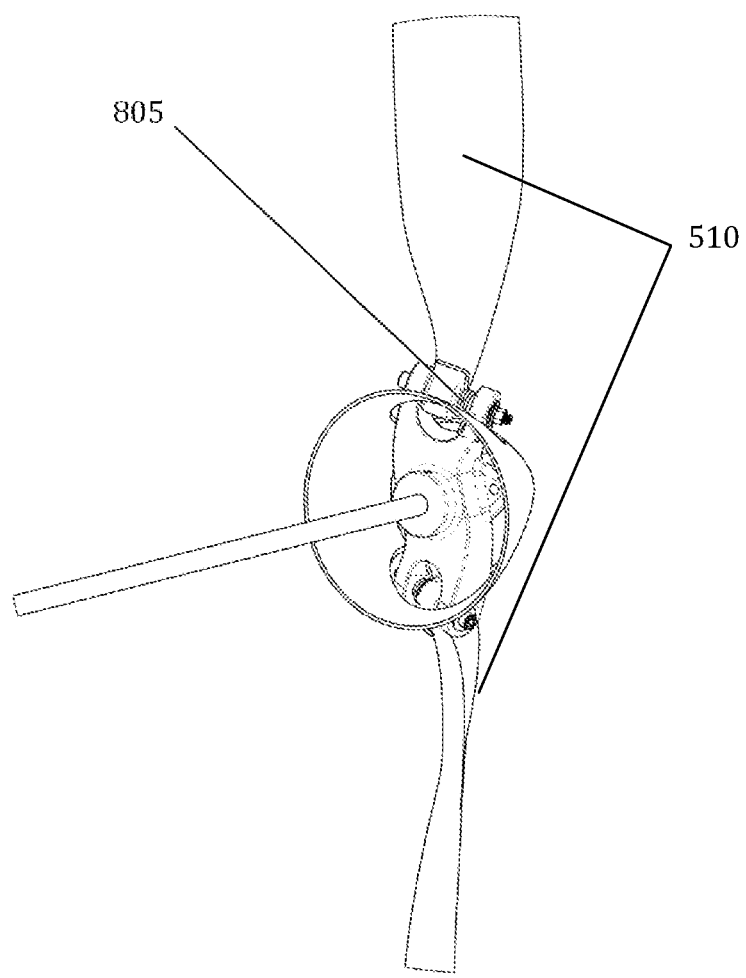
FIG. 8 illustrates a propeller and associated components.

It should be understood that the UAVDC may be configured with various propulsion mechanisms, and that propeller 135 illustrated in FIG. 8 is just one illustrated variation. Other propulsion mechanisms may include, but are not limited to, rockets, jet engines and compressed gas jets. Moreover, in some embodiments, no propulsion may be required at all, as the UAVDC may have characteristics of a glider. In such embodiments, the UAVDC may be launched from, for example, a tube or released from, for example, an airplane within gliding range of its mission target. The various properties of the UAVDC, as described in various embodiments herein, may provide the UAVDC with sufficient flight time (upon, for example, deployment as detailed below with reference to FIG. 14) to accomplish its mission without requiring additional propulsion.

Figure 9:
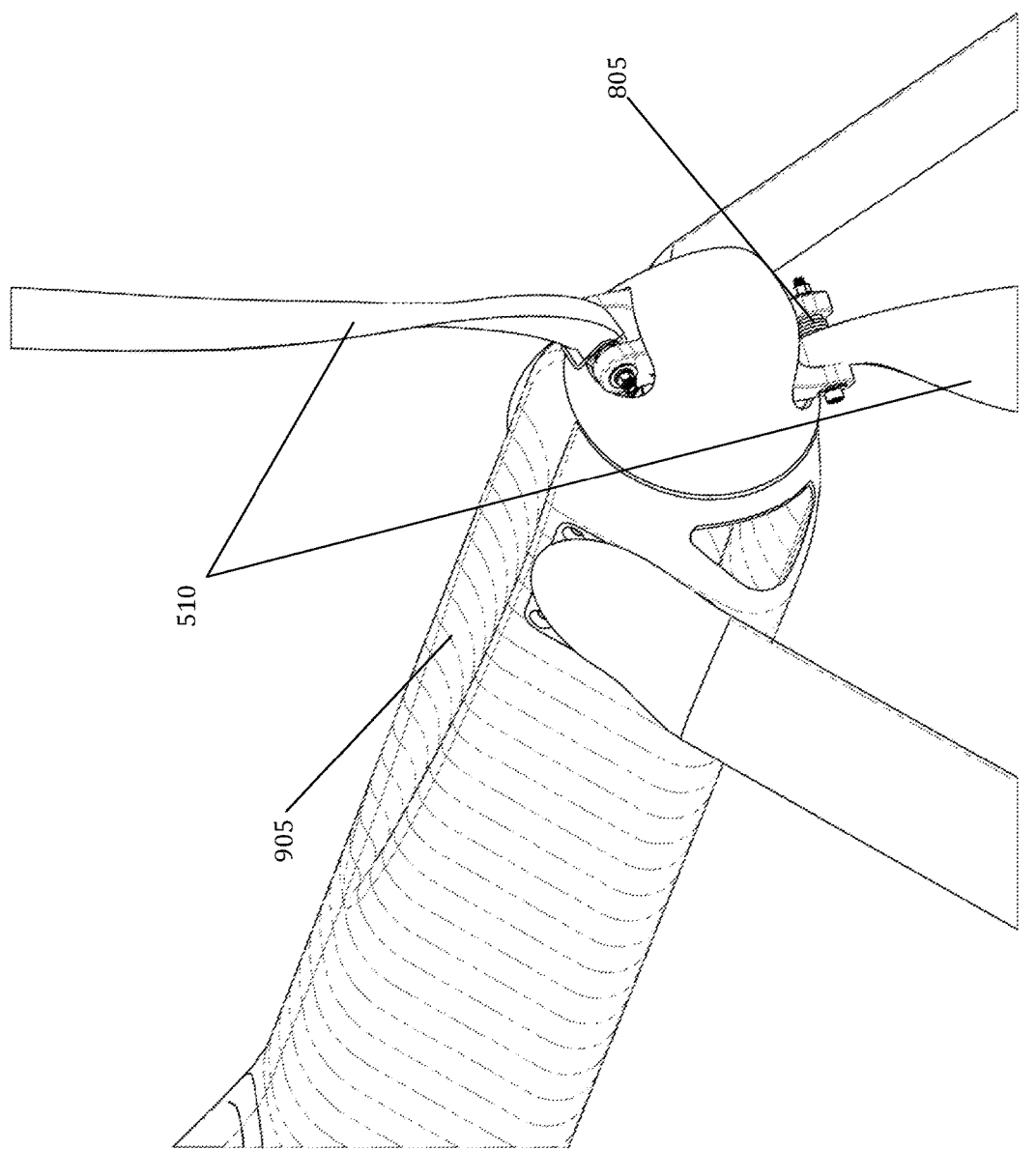
FIG. 9 illustrates grooves in the fuselage configured to receive propeller blades in a folded configuration.

Propeller 135 may comprise propeller blades 510 that fold against fuselage 106. While propeller 135 is shown as having two propeller blades 510, it should be understood that more or fewer propeller blades may be utilized. For example, only a single propeller blade may be used. As illustrated in FIG. 9, fuselage 106 may comprise grooves 905 configured to receive propeller blades 510 in a folded configuration. During flight, propeller 135 may be unfolded by means of, for example, air pressure (e.g. due to drag) against the propeller or centripetal force from rotation of propeller 135. In other embodiments, propeller 135 may be unfolded by using springs (e.g., torsion springs 805) to enable rapid deployment, thus preventing propeller blades 510 from hitting the stabilizers 125 before propeller 135 is completely unfolded.

Although many of the figures illustrate propeller 135 in a rear-mounted position, it should be understood that, in embodiments where a propulsion mechanism is provided, propeller 135 may be configured at different positions of the UAVDC. For example, in some embodiments, propeller 135 may mount to the front of the UAVDC instead of the rear. FIGS. 6D and 6E illustrate an embodiment of a UAVDC comprising a tractor propeller 675 mounting to the front of the UAVDC.

Moreover, the positioning of propeller 135 may be impacted by the deployment of wings 110. Referring to FIG. 10A, propeller blade 1005 is mounted to fuselage 106, trapped beneath wings 110. During a launch of the UAVDC in the first configuration, air drag or springs 805 may force propeller blade 1005 in the top position (e.g., mounted to the top of fuselage 106) towards its deployed state. Such deployment of propeller blade 1005, however, may be obstructed by wings 110 stowed immediately above, as illustrated in the first configuration.

The remaining propeller blade 1010 not obstructed by wings 110 may not be impeded from deployment, and therefore may deploy into the second configuration as designed. In order to prevent damage from the tendency of the remaining propeller blade 1010 to windmill while the propeller blade 1005 is still trapped, the hinge travel 1015 of the blades may be extended to allow blade 1010 to fold back to a position 1020 that aligns blade 1010 with the free stream as shown in FIG. 10B.

Referring back to FIG. 1A, the UAVDC may have a wing arrangement comprised of a single wing with two wing sections. The wing arrangement may be segmented in a left wing section and a right wing section to enable variable sweep at approximately a lateral plane of symmetry between the left wing section and the right wing section. In some embodiments, the wing sections may be a left wing and a right wing (e.g., wings 110). Still consistent with embodiments of the present disclosure, however, the wing arrangement may be a single wing comprised of the two wing sections.

The wing arrangement being configurable in a first arrangement (e.g., corresponding to the first configuration of the UAVDC), a second arrangement (e.g., corresponding to the second or third configuration of the UAVDC), and a third arrangement. In the first arrangement, the left wing section and the right wing section may be stowed against the fuselage at a first sweep deployment angle. In the second arrangement, the wing arrangement may be fully deployed for flight at a second sweep deployment angle. A third arrangement may comprise the wing sections at any wing deployment angle in between the first sweep deployment angle and the second sweep deployment angle.

To enable the sweep deployment angle, the UAVDC may comprise a sweeping gearbox configured to pivot the left wing section and the right wing section to enable the wing arrangement to sweep from the first arrangement to the second arrangement at any sweep deployment angle. The UAVDC may comprise an actuator coupled to the sweeping gearbox configured to actuate the sweeping of the wing arrangement at any sweep deployment angle.

Throughout the sweeping motion, fairing 130 may be configured to change from an open configuration to a closed configuration. Fairing 130 may begin in an open configuration by flexing to allow the first wing section and the second wing section to be stowed under the fairing in the first arrangement, and move to a closed configuration to provide aerodynamic and/or environmental advantages in the second arrangement.

The wings 110 may be stowed in a launch configuration as shown in first configuration 102. In some embodiments, the launch configuration of wings 110 may comprise a vertical offset. Wings 110 may be swept to a flight configuration by sweeping gearbox 205 (e.g., a sweeping means). For example, actuator 210 attached to sweeping gearbox 205 may comprise a worm gear 220 coupled to each wing and a worm 225 coupled to worm gears 220 and configured to spread the wings in sweeping motion 250. Sweeping gearbox 205 may sit on wing mount 215. Various other means may be used in sweeping wings 110, including, but not limited to, springs. In some embodiments, wings 110 may not need to be fully swept in order to enable flight. For example, the UAVDC may be capable of flight at an angle less than full sweep.

Figure 2D:
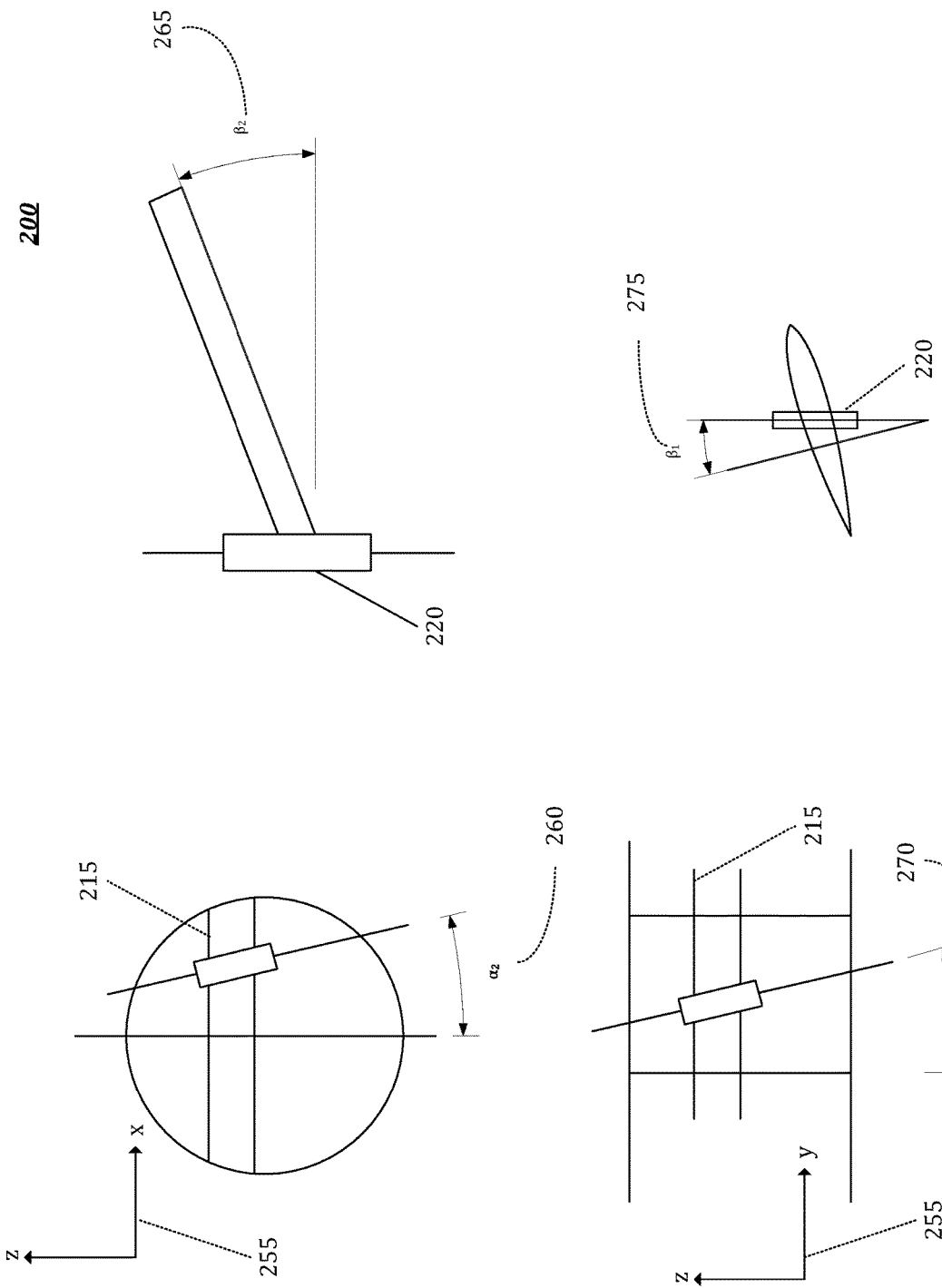
FIG. 2D illustrates a set of schematic drawings for enabling the sweeping gearbox to allow wings to have dihedral and incidence when deployed and to lay flat while stowed.

Gearbox 205 may be configured such that wings 110 may be stored in the launch configuration with a first set of angles with respect to each other (e.g., flat with respect to each other) and with respect to the fuselage (e.g., flat with respect to the fuselage). Gearbox 205 may further be configured to cause wings 110 to be deployed with optimal incidence angles and dihedral angles in the swept configuration. This may be achieved by orienting each wing's axis of rotation as well as each wing's attachment to worm gear 220 (or "wing pivot"). As such, gearbox 205 may comprise two pivot axes around which the wings may sweep. FIG. 2D illustrates a schematic for illustrating geometry to enable a gearbox 205. For example, the axis of rotation may be oriented such that its angle in the Y-Z plane 270, as shown in reference to axes 255, may match an angle of attachment 265 to worm gear 220. Further the angle in the X-Z plane 260 may match an angle of attachment 275 to worm gear 220. With this configuration, wings 110 may be stowed flat with respect to each other and with respect to the fuselage, while deployed with optimal dihedral and incidence angles. The optimal dihedral angle may be the combination of the angle in the X-Z plane 260 and the angle of attachment 265; the optimal angle of incidence may be the combination of the angle in the X-Y plane and the angle of attachment 275. In this way, a single mechanism may both sweep wings 110 and orient wings 110 to desired dihedral angles and angles of incidence. The single mechanism for sweeping and orienting wings may reduce weight and complexity, thus increasing endurance and decreasing cost.

The UAVDC may comprise fairing 130 to reduce drag while enabling the outward sweeping motion 250 of wings 110. FIGS. 11A and 11B illustrate fairing 130 in a first configuration 1105 and a second configuration 1110, respectively. Fairing 130 may be made of a flexible material (e.g., fiberglass) such that it may bend out of the way as wings 110 sweep. In various embodiments, other materials may be used, including, but not limited to carbon fiber, Kevlar, and sheet metal. Fairing 130 may comprise wing hole cutouts 1115 to fit around wings 110's profile as wings 110 reach second configuration 1110.

As illustrated in FIG. 11A, fairing 130 in first configuration 1105 may be resting upon the sweeping wings 110 in compact arrangement 102 and undergoing tension from being held in a strained ("buckled") state. Slits 1120 may be implemented in fairing 130 to enable fairing 130 to flex adequately to accommodate sweeping wings 110 in compact arrangement 102. Upon the UAVDC entering second configuration (e.g., expanded arrangement 105), fairing 130 may flex as illustrated in FIG. 11B to close around the wing as wings 110 reach wing hole cutouts 1115. In second configuration 1110, fairing 130 may be in an unstrained state as it securely fits around wing 110 to minimize drag. If fairing 130 comprises a fibrous composite material, it may be desirable to use a fiber orientation to facilitate buckling and flexibility in the laminate (e.g. using +/−45 degree plies may exhibit greater flexibility and buckle easily in 0 and 90 degree directions).

Figure 11C:
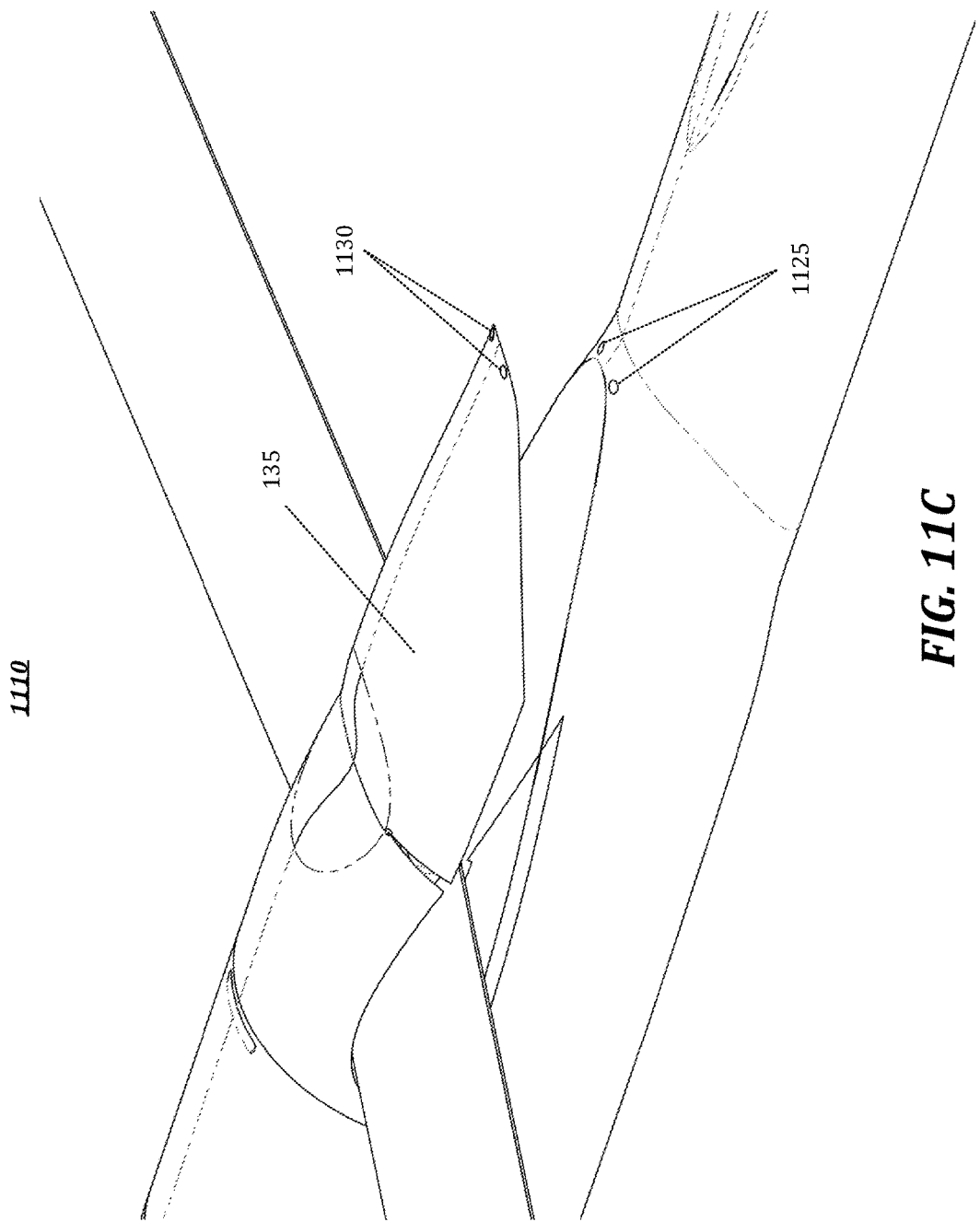
FIG. 11C illustrates the fairing comprising magnets.

In further embodiments, magnets 1125 may be employed to further lock fairing 130 around the swept wings 110, as shown in FIG. 11C. Magnets 1125 may be located on fuselage 106. Magnets of opposite polarity or a magnetic metal 1130 may be on fairing 130 to receive magnets 1125's magnetic attraction. In further embodiments, the location of the magnets 1125 and corresponding magnetic metal 1130 may be reversed.

As wings 110 are being swept, or, in some embodiments, after wings 110 have completely been swept, wings 110 may telescope. For example, inner section 305 may attach to fuselage 106 of the UAVDC. Inner section 305 may be stowed at least partially within outer section 310 during the compact first configuration. Outer section 310 may comprise a substantially hollow interior. An exterior surface of interior section 305 may be stowed against and interior surface of the exterior section 310. To reach the second configuration, outer section 310 may slide along inner section 305 to extend outwards from the fuselage 106. As outer section 310 slides along inner section 305, an increasing portion of inner section 305 may be exposed. The wingspan of wings 110 may be approximately the length of exterior section 310 and the exposed portion of interior section 305. Both inner section 305 and outer section 310 may employ an aerodynamic profile to provide lift during flight. Some embodiments may utilize belt system 315 for telescoping wings 110.

Belt system 315 may comprise belt pulleys 325, which may attach to the inner wing section 305 ("second section"). At least one pulley 325 may be driven by an actuator 320. In further embodiments, a plurality of pulleys 325 may be driven by a plurality of actuators 320. Belt 330 may loop around pulleys 325. Notches in belt 330 may enable actuator 320 to move belt 330. One of the straight lengths 331 of belt 330 may be contained within the inner wing section 305, while the other length 332 of belt 330 may be contained in a groove on the bottom of the inner wing section 305 ("second section") that is exposed to the outer wing section 310 ("first section") prior to the telescoping of wings 110.

To enable telescoping, belt 330 may be attached to at least a portion of outer wing section 310 along length 332. In this way, actuator 320's rotation not only causes a movement of belt 330 but also a displacement of outer wing section 310 due to its attachment to belt 330. Accordingly, actuation in direction 335 would cause section 310 to be extended outward from the fuselage 106, thereby increasing the wingspan of the UAVDC. As outer section 310 travels outward, inner section 305 is simultaneously withdrawn from the interior of outer section 310, increasing the wingspan of the UAVDC. Accordingly, as wings 110 are telescoped, length 332 may become exposed but the groove may prevent the belt 330 from protruding from the bottom of the exposed inner wing section 305.

Attaching outer section 310 to length 332 may be implemented by, for example, but not limited to, a clamp, screw or adhesive. In some embodiments, belt 330 may comprise a length of fiber-reinforced rubber material. By stripping rubber from each end of the belt to expose fibers, further attachment mechanisms for attaching belt 330 to outer section 310 may be available. For example, the exposed fibers may be tied to the outer wing section 310 (e.g., to holes in outer wing section 310). The tied fibers may further be secured, for example, with an adhesive. In this way, ends of belt 330 may be attached to create a connected loop without the use of a coupler clamping the ends, thereby eliminating bulky parts commonly used in the art.

Consistent with embodiments of the present disclosure, belt system 315 may provide a lighter and/or a more compact mechanism for telescoping over conventional telescoping systems. In some embodiments, the telescoping of the wings may be reversed by reversing direction 335 of actuator 320 to retract wings 110. In further embodiments consistent with the present disclosure, components of belt system 315 may be reversed, such that outer wing section 310 may be affixed to fuselage 106 and inner wing section 305 may be telescoped outward. In yet further embodiments, a similar belt system may be implemented for extending a boom from fuselage 106. For example, instead of attaching belt 330 to outer wing section 310, belt 330 may attach to the boom.

Wings 110 may comprise ailerons 120. In some embodiments, ailerons 120 may be attached via a hinge 1215 to the trailing edge of outer section 310. In this way, ailerons 120 may minimize interference with outer section 310's internal volume as compared to conventional ailerons. By optimizing outer section 310's internal volume, inner section 305 may have an optimized profile and an increased span that would otherwise be limited by the more commonly-used ailerons. For example, inner section 305 may, when stowed within the first compact configuration, overlap at least a portion of the length of the trailing edge aileron attachment to outer section 310. In this way, a ratio of the surface area between the inner section 305 and outer section 310 may be increased. Maximizing wing span can significantly increase airframe efficiency, flight endurance, and payload capacity. Hinge types that may enable such trailing edge ailerons 120 include, but are not limited to, a living hinge, or other flexure bearing.

Figure 12A:
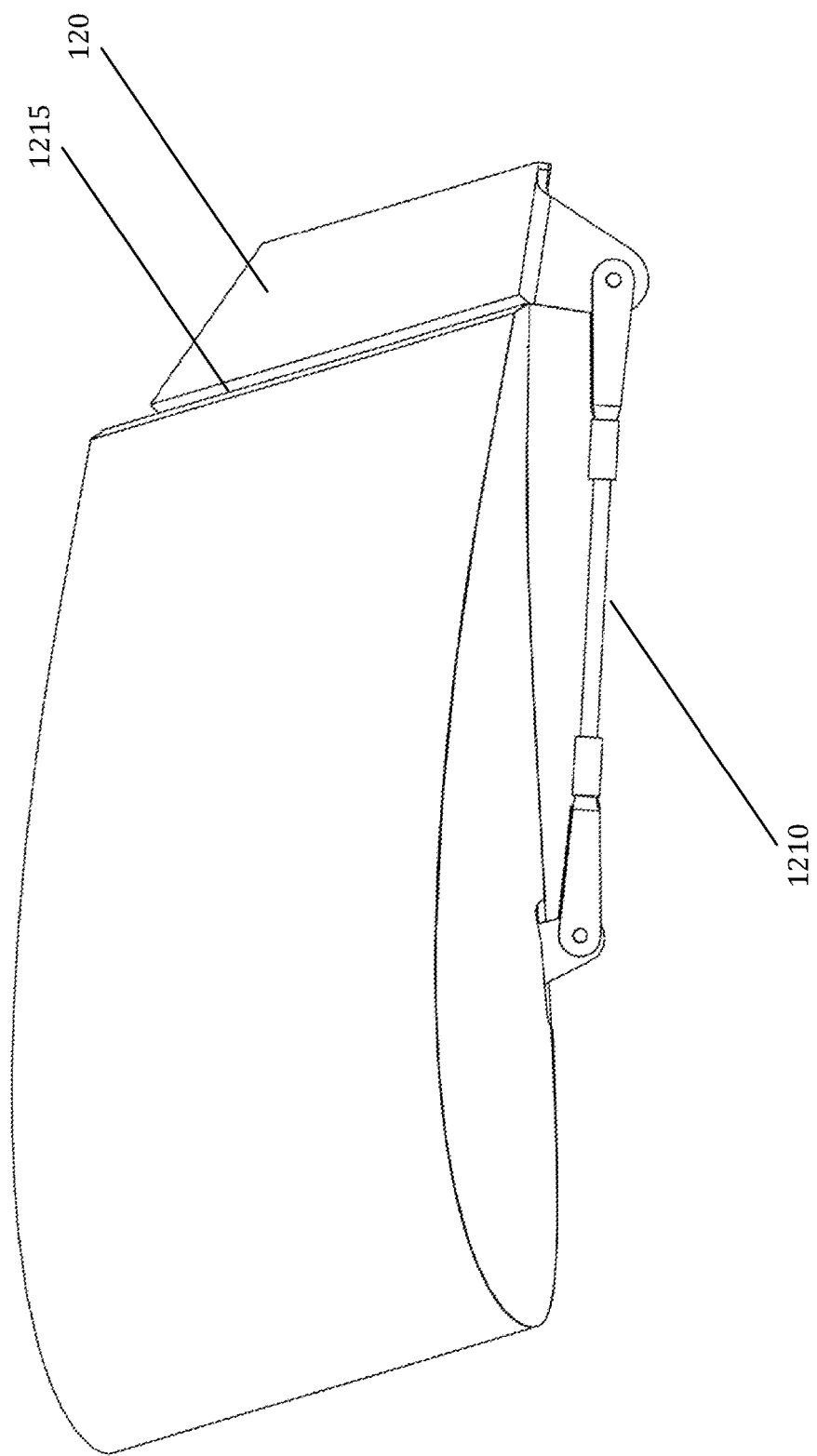
FIG. 12A illustrates components for controlling ailerons.
Figure 13:
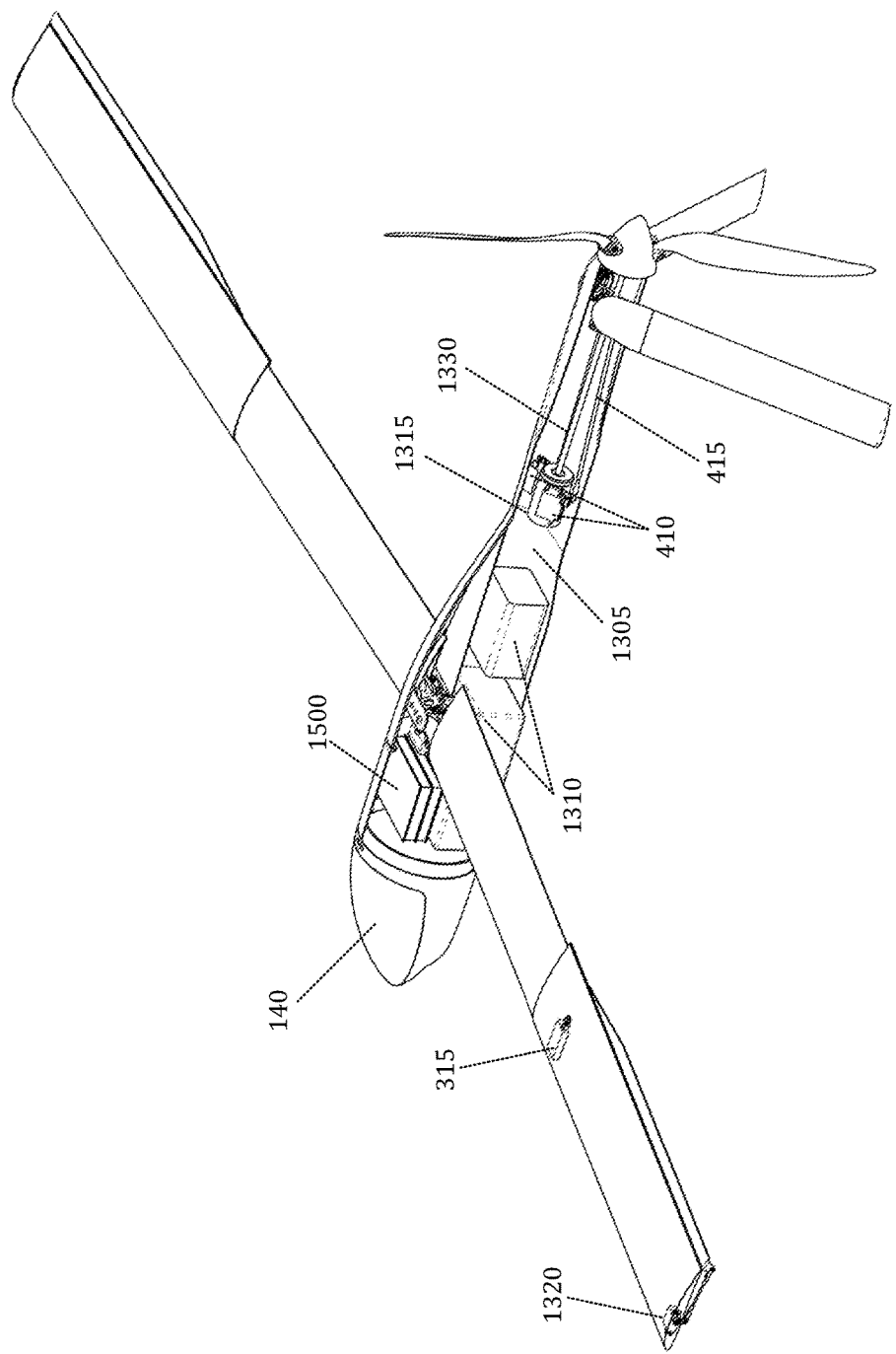
FIG. 13 illustrates one example of internal configuration of the UAVDC.

Further, by mounting ailerons 120 to the outer section 310 extending away from fuselage 106, ailerons 120 may enable roll control throughout the wing deployment phase. This means the UAVDC may be flown with positive roll control regardless of outer section 310's position relative to inner section 305, which can be beneficial during launch and flight recovery phases where transition to stable flight can be carried out with lower structural loads on the air frame when the wings are configured in their non-telescoped position. This may also be beneficial as the span may be reduced or increased in flight, to maximize aerodynamic efficiency without losing roll control. FIG. 12A shows a configuration of components for controlling the ailerons. Each aileron 120 may be positioned by a servo 1320, as illustrated in FIG. 13, through a linkage 1210. Each servo 1320 may, in some embodiments, be positioned within outer wing section 310. In further embodiments, ailerons 120 may be operated by other means, including, but not limited to, gears or shafts. Each servo 1320 may be controlled by controller 1500

Figure 12B:
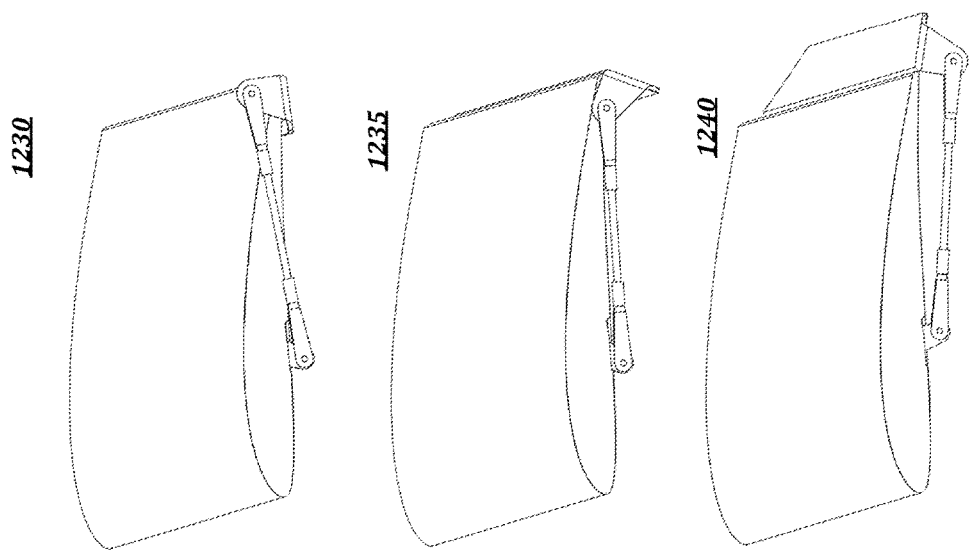
FIG. 12B illustrates a plurality of configurations for the ailerons.

FIG. 12B illustrates possible configurations for ailerons 120, including, but not limited to, a tucked position 1230, which minimizes stowed volume, a partially folded position 1235, and a fully deployed position 1240. Servo 1320 may be operated through a control wire positioned within outer wing section 310 and inner wing section 305. The control wire may extend from fuselage 106 via inner wing section 305. An end of wing section 305 may comprise an opening through which the control wire may extend into the interior of outer wing section 310, connecting to servo 1320. In various embodiments, the wire may comprise sufficient length to accommodate the telescoping of the wings. While the wings are not telescoped, the control wire may be spooled or neatly folded within either of the wing sections.

FIGS. 4A-4D illustrate an embodiment of a deployable pivoting control surface embodied as a stabilizer 125. While this disclosure uses the term "stabilizers" in reference to deployable pivoting and/or pitching control surfaces, it should be understood that such controls surfaces may not be limited to stabilizers. For example, deployable pivoting control surfaces implementing the same components may be used in other ways, including, but not limited to, wings.

In some embodiments, stabilizers 125 may be moved into the flight configuration by other means, including, but not limited to, air drag. In further embodiments, stabilizers 125 may be spring-loaded such that they move into the flight configuration upon launch. For example, torsion springs 405 may move stabilizers 125 into the flight configuration. Stabilizers 125 may be used to provide flight control by servos 410 operating push rods 415 and control horns 416 which pivot the stabilizer about axis 425. For example, servos 410 may cause stabilizers 125 to rotate around axis 425 by pivoting within hinge 420. Further, stabilizers 125 may comprise fairings 485. Fairings 485 may be embodied as a flexible material (e.g. a rubber or elastomer) configured to go around shaft 445 for enabling a pitching motion while maintaining aerodynamic efficiency as shown in FIGS. 4E through 4G. As stated above, stabilizers 125 may comprise one or more antennas 705 such that deployment of stabilizers 125 may further deploy one or more antennas 705.

Stabilizers 125 may move into the flight configuration by pivoting around axis 430. In this way, axis 430 may be constant relative to fuselage 106 in transition from first configuration 450 to second configuration 455. Further, by aligning control horn 416's centerline with axis 430 during deployment, servos 410 need not move during transition 440 from first configuration 450 to second configuration 455, as further shown in FIGS. 4A and 4B.

Servos 410 may be configured to move push rods 415 coupled to control horns 416 on the at least one stabilizer for deflecting/rotating the at least one stabilizer about its spanwise axis. Control horns 416, in turn, may be configured to remain in a relatively fixed position as the at least one stabilizer deploys into flight configuration (the second configuration).

FIGS. 4E-4G illustrate a stabilizer fairing 485. Stabilizer fairing 485 may be used to cover the various components that enable the least one stabilizer to be deflected/rotated about its spanwise axis to provide positive flight control while in the second stabilizer configuration 455. Stabilizer fairing 485 may comprise a flexible material, such as, for example, rubber. As such, stabilizer fairing 485 may reduce drag on various components, including, but not limited to shaft 445, while flexing to enable the full range of motion of stabilizer 125.

A number of internal components may be mounted within an interior 1305 of fuselage 106. FIG. 13 illustrates one example of internal configuration of the UAVDC in which a power source 1310 may be positioned within the interior of fuselage 106. Power source 1310 may comprise, for example, a fuel tank or one or more batteries. Various components of the UAVDC may be connected to power source 1310, including, but not limited to, modular payload 140, controller 1500, sweeping gearbox actuator 210, control mechanisms for ailerons (e.g., servos 1320), servos 410 for stabilizers 125, a motor 1315 to drive the propeller 135, and antenna 705. Embodiments of the UAVDC comprising a propulsion device (e.g., propeller 135) may be powered by alternative power sources, such as, for example, an internal combustion engine. In such embodiments, a fuel source for the internal combustion engine (e.g., gas tank) may be positioned within interior 1305 of fuselage 106.

Internal components may further include, for example, but not be limited to, the following components, which will be further detailed with reference to section III below, sweeping gearbox 205 and actuator 210 employed to sweep wings 110; control mechanisms for ailerons 120 (e.g., servos 1320) for operating ailerons 120 and servos 410 for operating stabilizers 125); a motor 1315 for driving propeller 135; driveshaft 1330 for coupling motor 1315 to propeller 135 and an on-board controller 1500 for controlling the deployment, flight, and operation of the UAVDC. The illustrated configuration of internal components is just one possible configuration, and other embodiments are possible. The interior components may be distributed to balance the weight in an optimal way for flight.

III. OPERATION

Figure 14:
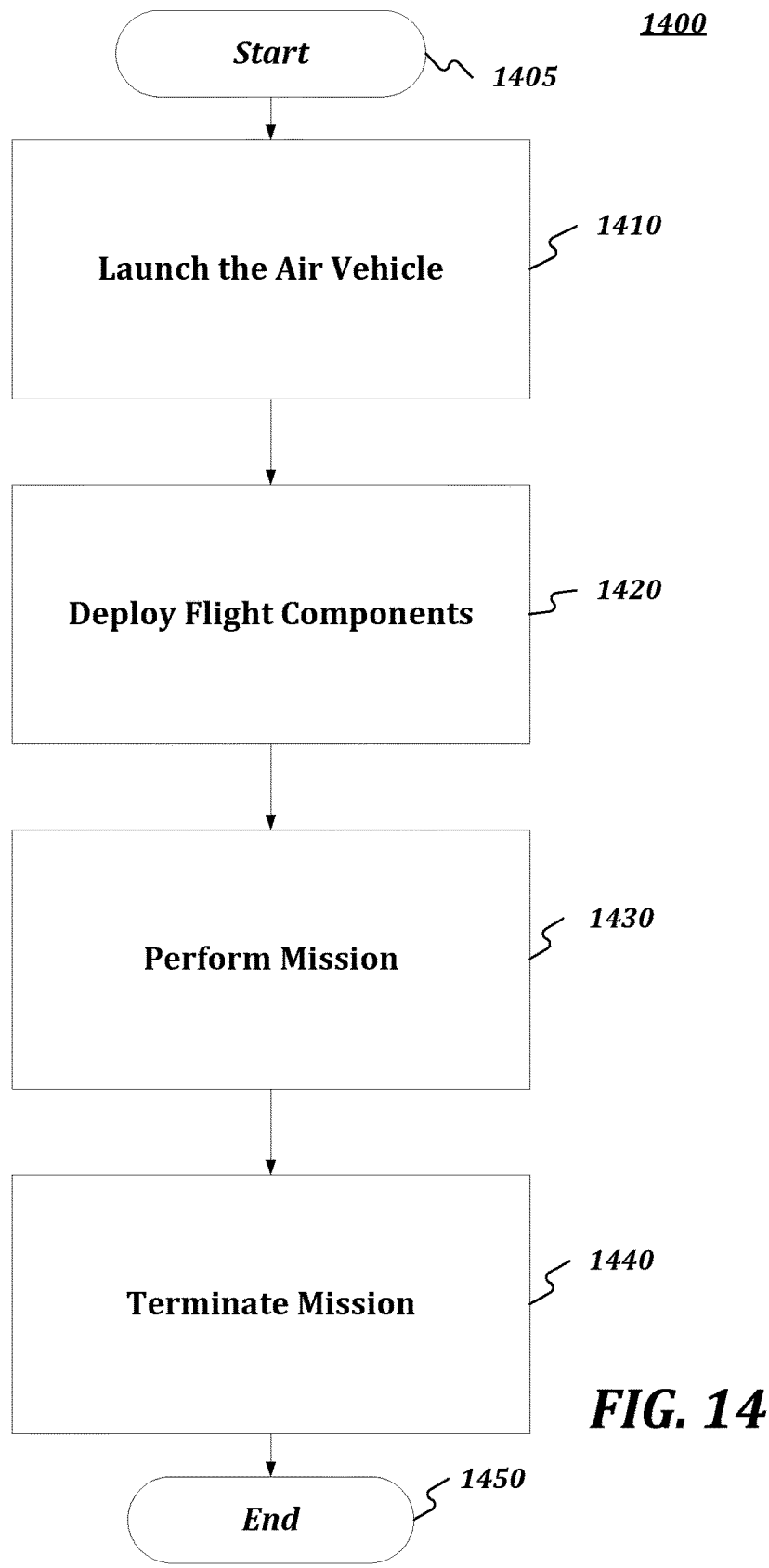
FIG. 14 illustrates a method for using the unmanned aerial vehicle with deployable components.

FIG. 14 is a flow chart setting forth the general stages involved in a method 1400 consistent with an embodiment of the disclosure for operating the UAVDC. Method 1400 may be implemented using, at least in part, a controller 1500 (e.g., on board computing device) as described in more detail below with respect to FIG. 15. Controller 1500 may comprise a controller for operating the deployable components as well as well as performing other mission details, including, but not limited to, flight control, payload operation, and communication. As such, controller 1500 may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, inertial measurement unit, global positioning system, various telemetry sensors, and antenna 705, as well as all other units. As will be detailed with reference to FIG. 15, controller 1500 may comprise a remote communication module to enable remotely operation as described above with reference to antenna 705. In other embodiments, controller 1500 may be completely self-operating upon configuration. In this way, the UAVDC may be self-piloting.

Furthermore, although stages are disclosed with reference to controller 1500, it should be understood that a plurality of other components may enable the operation of method 1400, including, but not limited to, other computing components, mechanical components, environment properties (e.g., air resistance), remote operators, and the like.

Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1400 may begin at starting block 1405 and proceed to stage 1410, where the UAVDC may be launched. For example, the UAVDC may be fired from a tube launched from a craft or dropped from a carrier aerial vehicle. The compact arrangement 102 of the UAVDC's first configuration (as specified, for example, with reference to FIG. 1A) may enable the UAVDC to be tube-launched as, for example, a missile. In some embodiments, once dropped from a carrier aerial vehicle, the UAVDC may be aerodynamically designed (as illustrated) and with such a weight distribution that it may self-orient from a tumbling drop into a dive.

From stage 1410, where the UAVDC is launched, method 1400 may proceed to stage 1420 where the flight components may be deployed. The deployment of flight components, though disclosed in a particular order for illustrative purposes, may occur in other arrangements.

Upon launch, the stabilizers 125 and propeller 135 may deploy. In applicable embodiments, springs 405 and springs 805, may deploy stabilizers 125 and propeller blades 510, respectively. In other embodiments, the air resistance at launch and the stowed arrangement of stabilizers 125 (e.g., first stabilizer configuration 450) and propeller blades 510 create a force in a vector of expansion, thereby causing stabilizers 125 and propeller blades 510 to deploy in a deployed arrangement (e.g., second stabilizer configuration 455).

Controller 1500 (e.g., on-board computing-device) may automatically engage actuators and the wing deployment mechanisms instantly or after a set amount of time has passed since the launch. In other embodiments, engagement may occur upon certain reading from on-board sensors (e.g., including, but not limited to, sensors deployed in modular payload 140). For example, wing deployment and extension may be dependent on certain in-flight factors such as, for example, velocity, acceleration, and leveling of the UAVDC. Controller 1500 may be configured to trigger deployment of various components upon the satisfaction of certain pre-set conditions. Such conditions may be defined prior to deployment.

Actuator 210 may drive sweeping gearbox 205 to sweep wings 110. In some embodiments, the UAVDC may be capable of controlling sustained flight once wings 110 sweep out 45 degrees. As wings 110 reach full sweep, wings 110 may move within wing hole cutouts 1115 of fairing 130, which has opened due to the strain of the sweeping motion 250, and relocked with the aid of magnets positioned within the fuselage. Accordingly, fairing 130 may automatically snap shut around the profile of wings 110 to improve aerodynamics. Magnets 1125 may further lock fairing 130 around wings 110.

As wings 110 begin sweeping, or after wings 110 are fully swept, wings 110 may begin telescoping. For example, belt system 315 may pull outer section 310 along inner section 305 to telescope wings 110. The wing sweep angles and telescoped positions may further be dynamically adjusted in flight.

Further, in embodiments where deployable, modular payload 140 may deploy from its first arrangement to its second arrangement. For example, modular payload 140 may comprise a plurality of sensing devices better situated for performance at a deployed position (e.g., an extended boom). Such deployment may occur upon the post-launch stabilization segment of the UAVDC's flight.

From stage 1420, where the flight components are deployed and UAVDC flight is stabilized, method 1400 may proceed to stage 1430, where the UAVDC may be used to perform a mission. During all stages of flight, the UAVDC may be in operable communication with an operator via antenna 705. The operator may receive various readings from the various components of the UAVDC.

In some embodiments, the operator may control the operation of the UAVDC during the mission. For example, the operator may be able to control the flight components, including, but not limited to, the wing deployment mechanisms (e.g., sweeping gearbox 205, actuator 210, and belt system 315), propeller 135, stabilizers 125, ailerons 120, and further deployable components (e.g. telescoping boom 710 for antenna 705, and boom 655 for antenna 650). In other embodiments, on-board controller 1500 may be pre-configured with mission control data.

Embodiments of the UAVDC may be used for a plurality of missions including, but not limited to, data capture, payload deployment, and providing a telecommunications relay. In addition to communicating for flight control, embodiments of the UAVDC may be controlled in data capture and transmission. In further embodiments, the UAVDC may enable the operator to release modular payload 140.

From stage 1430, where the UAVDC is used to perform a mission, method 1400 may proceed to stage 1440, where the mission is terminated. For example, the mission may be terminated by flying the UAVDC to a recapture location where it may be recovered. Further, the UAVDC may terminate a mission by crash landing. For example, the UAVDC may be flown into rocks or a hard surface in order to destroy functional components. In further embodiments, the UAVDC may be equipped with an explosive device such that it may be self-destructed upon mission completion. After stage 1440, method 1400 may end at stage 1450.

IV. ON-BOARD SYSTEM ARCHITECTURE

The UAVDC may comprise, but not be limited to, an on-board computing module. The computing module may be in operative configuration and communication with, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. Further, the computing device may be in operative communication with another computing device consistent with the description herein, and may comprise, but not be limited to, a desktop computer, laptop, a tablet, or mobile telecommunications device. Such remote devices may be used to control and/or configure on-board computing module (e.g., deployment conditions, mission controls, and the like).

Moreover, the UAVDC may be in operative communication with a centralized server, such as, for example, a cloud computing service. Although operation has been described to be performed, in part, by a controller 1500, it should be understood that, in some embodiments, different operations may be performed by different networked elements in operative communication with controller 1500.

Embodiments of the present disclosure may comprise a system having a memory storage and a processing unit. The processing unit may be coupled to the memory storage, wherein the processing unit is configured to perform the stages of method 1400.

Figure 15:
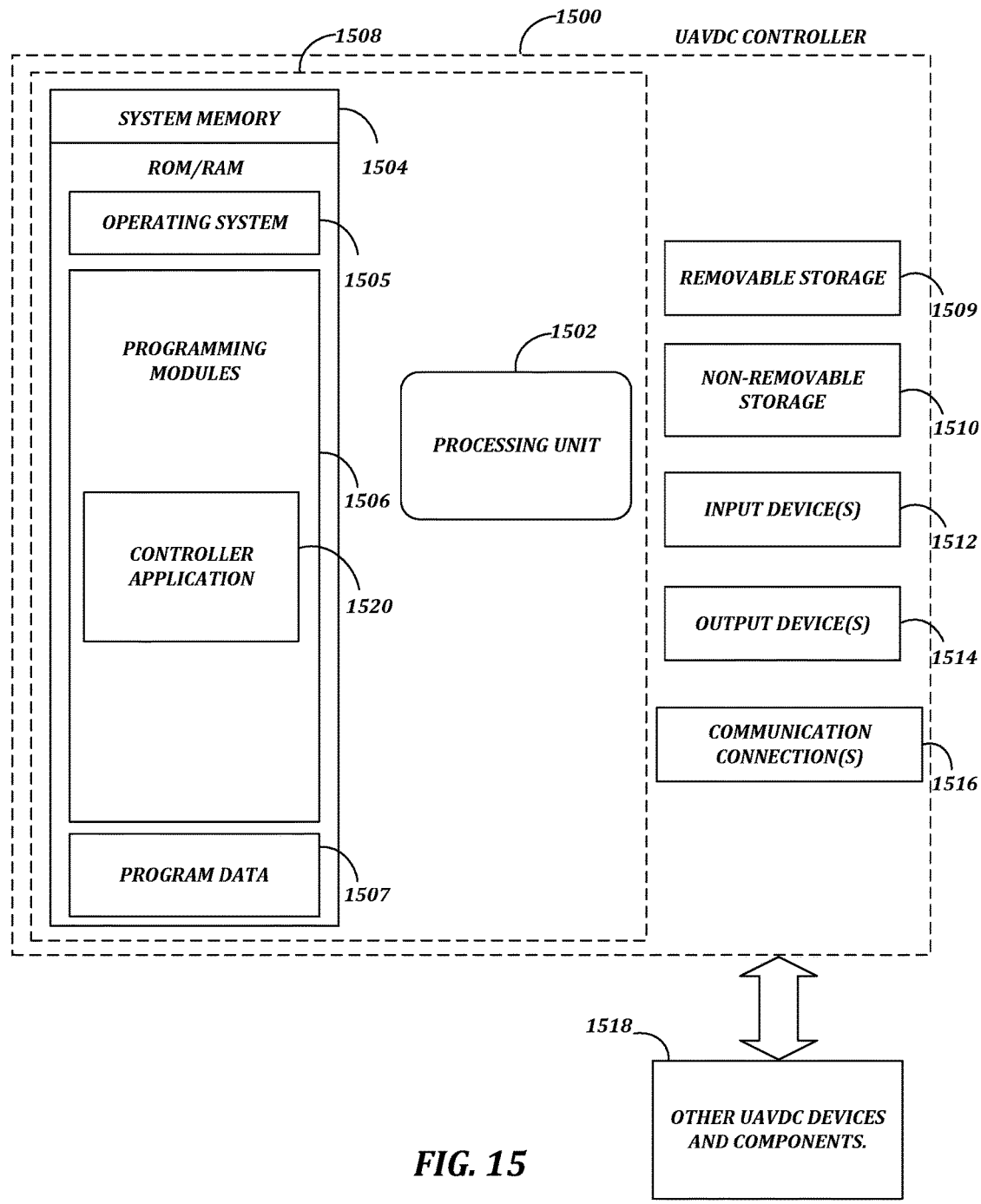
FIG. 15 is a block diagram of a system including a computing device for enabling operation of the apparatus.

FIG. 15 is a block diagram of a system including controller 1500. Consistent with an embodiment of the disclosure, the aforementioned memory storage and processing unit may be implemented in a computing device, such as controller 1500 of FIG. 15. Any suitable combination of hardware, software, or firmware may be used to implement the memory storage and processing unit. For example, the memory storage and processing unit may be implemented with controller 1500 or any of other UAVDC devices and components 1518, in combination with controller 1500. Other UAVDC devices and components 1518 may comprise, for example, but not be limited to, modular payload 140, sweeping gearbox actuator 210, control mechanisms for ailerons 120 (e.g., servos 1320), servos 410 for stabilizers 125, a motor 1315 to drive the propeller 135, power source 1310, global positioning system, various telemetry sensors, and antenna 705. The aforementioned system, device, and processors are examples and other systems, devices, and processors may comprise the aforementioned memory storage and processing unit, consistent with embodiments of the disclosure.

With reference to FIG. 15, a system consistent with an embodiment of the disclosure may include a computing device, such as controller 1500. In a basic configuration, controller 1500 may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling controller 1500's operation. In one embodiment, programming modules 1506 may include flight control application 1520. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Controller 1500 may have additional features or functionality. For example, controller 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by controller 1500. Any such computer storage media may be part of device 1500. Controller 1500 may also be operative with input device(s) 1512 such as a keyboard, a mouse, a pen, a sound input device, a touch input device, etc. Input device(s) 1512 may be used to, for example, manually access and program controller 1500. Output device(s) 1514 such as a display, speakers, a printer, etc. may also be included. The aforementioned devices are examples and others may be used.

Controller 1500 may also contain a communication connection 1516 that may allow device 1500 to communicate with other UAVDC devices and components 1518 (e.g., antenna 705), such as over an encrypted network in a distributed computing environment. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., controller application 1520) may perform processes including, for example, one or more of stages or portions of stages of method 1400 as described above. Controller application 1520 may be configured to operate UAVDC devices and components 1518 and receive instructions from, for example, communications connections module 1516. The aforementioned process is an example, and processing unit 1502 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

V. CLAIMS

While the specification includes examples, the disclosure's scope is indicated by the following claims. Furthermore, while the specification has been described in language specific to structural features and/or methodological acts, the claims are not limited to the features or acts described above.

Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. An unmanned aerial vehicle (UAV) comprising:
   a fuselage;
   at least one wing having an inner wing section stowed in an interior of an outer wing section;
   at least one stabilizer,
   wherein the at least one wing and at least one stabilizer are configurable in at least the following arrangements:
      a compact arrangement comprising:
         the at least one wing stowed against the fuselage, and
         the at least one stabilizer stowed against the fuselage,
      a deployed arrangement comprising:
         the at least one wing deployed from the fuselage, and
         the least one stabilizer deployed from the fuselage, and
      an expanded arrangement comprising:
         the at least one wing is telescoped to increase a wingspan of the deployed arrangement; and
   at least one control surface hinged to the outer wing section of the at least one wing, wherein the at least one control surface is enabled to actuate when the UAV is transitioning from the compact arrangement to the deployed arrangement in order to stabilize the UAV for subsequent transition to the expanded arrangement.

2. The UAV of claim 1, further comprising:
   a sweeping means for deploying the at least one wing from the compact arrangement to the deployed arrangement.

3. The UAV of claim 1, further comprising:
   a telescoping means for expanding the wingspan of the at least one wing from the deployed arrangement to the expanded arrangement.

4. The UAV of claim 1, wherein the at least one stabilizer is configured to deploy from the compact arrangement to the deployed arrangement by a spring configured to force the at least one stabilizer into the deployed position.

5. The UAV of claim 1, further comprising:
   a propulsion means.

6. The UAV of claim 5, wherein the propulsion means comprises at least one blade.

7. The UAV of claim 6, wherein the at least one blade is:
   stowed against the fuselage in the compact arrangement, and
   deployed from the fuselage in the deployed arrangement and the expanded arrangement.

8. The UAV of claim 1, further comprising:
   a modular payload fuselage section.

9. The UAV of claim 1, further comprising:
   a deployable payload comprising:
      a first configuration in the compact arrangement and a second configuration in at least one of the following: the deployed arrangement and the expanded arrangement.

10. The UAV of claim 1, wherein the compact arrangement enables the UAV to be stored in at least one of the following: a tube, a weapons bay, and a wing attachment.

11. The UAV of claim 1, wherein the deployed arrangement is configured to stabilize the UAV into a controlled flight.

12. The UAV of claim 11, wherein the deployed arrangement being configured to stabilize the UAV into the controlled flight comprises the at least one wing and the at least one stabilizer being configured to deploy into the deployed arrangement after a release from at least one of the following: the tube, the weapons bay, and the wing attachment.

13. The UAV of claim 1, wherein the expanded arrangement is configured to increase an efficiency of the controlled flight.

14. The UAV of claim 13, wherein the expanded arrangement being configured to increase the efficiency of the controlled flight comprises the at least one wing being configured to telescope upon having stabilized into the controlled flight.

* * * * *